(12) United States Patent
Giltner et al.

(10) Patent No.: US 11,640,282 B2
(45) Date of Patent: May 2, 2023

(54) METHOD, APPARATUS, AND SYSTEM FOR PROVIDING A BROKER FOR DATA MODELING AND CODE GENERATION

(71) Applicant: HERE GLOBAL B.V., Eindhoven (NL)

(72) Inventors: Ryan Giltner, Chicago, IL (US); Paul Ford, Chicago, IL (US); Nunzio Visciano, Berlin (DE); Stefano Pettini, Berlin (DE); Lucas Brutschy, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 17/079,064

(22) Filed: Oct. 23, 2020

(65) Prior Publication Data
US 2021/0124564 A1   Apr. 29, 2021

Related U.S. Application Data

(60) Provisional application No. 62/925,572, filed on Oct. 24, 2019.

(51) Int. Cl.
*G06F 9/44* (2018.01)
*G06F 8/35* (2018.01)
*G06F 9/38* (2018.01)
*G06F 8/41* (2018.01)

(52) U.S. Cl.
CPC .................. *G06F 8/35* (2013.01); *G06F 8/42* (2013.01); *G06F 8/436* (2013.01); *G06F 9/3836* (2013.01)

(58) Field of Classification Search
CPC ..................... G06F 8/35; G06F 8/40

USPC ................................................. 717/104, 106
See application file for complete search history.

(56) References Cited

U.S. PATENT DOCUMENTS 5,970,490 A * 10/1999 Morgenstern ......... G06F 16/258
6,928,488 B1   7/2005 De Jong et al.
7,150,004 B2   12/2006 Russell et al.
(Continued)

FOREIGN PATENT DOCUMENTS

WO   WO-2016163901 A1 * 10/2016 ............... G06F 8/44
WO   WO-2020021047 A1 *  1/2020 ............... G06F 8/40

OTHER PUBLICATIONS

Dirk Eddelbuettel et al. "RProtoBuf: Efficient Cross-Language Data Serialization in R"; Journal of Statistical Software Jul. 2016, vol. 71, Issue 2.*

(Continued)

*Primary Examiner* — Francisco J Aponte
(74) *Attorney, Agent, or Firm* — Ditthavong, Steiner & Mlotkowski

(57) ABSTRACT

An approach is provided for data modeling and code generation. The approach involves, for example, providing a syntax for generating a model representing data and semantics of the data. The approach also involves providing an architecture configured to accept the data according to any of a plurality of data representations. The approach further involves providing a code generator configured to generate computer code to transform the data between the plurality of data representations by using the model as a broker between the plurality of data representations. The code generator preserves the semantics of the data during the transforming of the data.

20 Claims, 21 Drawing Sheets

(56) References Cited

U.S. PATENT DOCUMENTS

| | | | | |
|---|---|---|---|---|
| 7,917,890 | B2* | 3/2011 | Barcellona | G06F 8/10 |
| | | | | 717/106 |
| 8,495,580 | B2* | 7/2013 | Gowri | G06F 11/3608 |
| | | | | 717/126 |
| 8,566,783 | B2* | 10/2013 | Li | G06F 8/35 |
| | | | | 717/110 |
| 8,869,098 | B2* | 10/2014 | Elaasar | G06F 8/10 |
| | | | | 717/104 |
| 8,869,103 | B2* | 10/2014 | Conrad | G06F 11/3604 |
| | | | | 717/106 |
| 9,063,672 | B2* | 6/2015 | Madl | G06F 8/35 |
| 9,229,696 | B2* | 1/2016 | Box | G06F 8/437 |
| 10,241,784 | B2* | 3/2019 | Hamby | G06F 8/41 |
| 10,255,051 | B2* | 4/2019 | Kulkarni | G06Q 10/067 |
| 10,437,564 | B1* | 10/2019 | Periwal | G06F 8/315 |
| 10,511,515 | B1* | 12/2019 | Ehlinger | H04L 69/08 |
| 10,528,329 | B1* | 1/2020 | Doyle | G06F 8/31 |
| 10,732,944 | B1* | 8/2020 | Feng | G06F 8/30 |
| 11,204,747 | B1* | 12/2021 | Zejda | G06F 9/451 |
| 11,392,578 | B1* | 7/2022 | James | G06F 16/24573 |
| 2004/0015834 | A1* | 1/2004 | Mestre | G06F 8/10 |
| | | | | 717/106 |
| 2009/0024986 | A1* | 1/2009 | Meijer | G06F 8/437 |
| | | | | 717/137 |
| 2010/0161821 | A1* | 6/2010 | Slamkovic | H04L 69/08 |
| | | | | 709/230 |
| 2012/0278788 | A1* | 11/2012 | Crapo | G06F 8/51 |
| | | | | 717/106 |
| 2013/0139134 | A1* | 5/2013 | Burka | G06F 8/443 |
| | | | | 717/153 |
| 2015/0142781 | A1* | 5/2015 | Nigam | G06F 16/20 |
| | | | | 707/722 |
| 2015/0347620 | A1* | 12/2015 | Cai | G06F 16/284 |
| | | | | 707/809 |
| 2016/0004516 | A1* | 1/2016 | Ivanov | G06F 8/35 |
| | | | | 717/106 |
| 2017/0212738 | A1* | 7/2017 | Hernandez-Sherrington | |
| | | | | G06F 8/41 |
| 2017/0255452 | A1* | 9/2017 | Barnes | H04L 67/12 |
| 2017/0269913 | A1* | 9/2017 | Meijer | G06F 8/40 |
| 2018/0024814 | A1* | 1/2018 | Ouali | G06F 11/3688 |
| | | | | 717/105 |
| 2018/0052861 | A1* | 2/2018 | Seetharaman | G06F 3/0649 |
| 2018/0052870 | A1* | 2/2018 | Stojanovic | G06Q 10/0637 |
| 2018/0081655 | A1* | 3/2018 | Kudriavtsev | G06F 8/51 |
| 2018/0129487 | A1* | 5/2018 | Hernandez-Sherrington | |
| | | | | G06F 16/00 |
| 2018/0157469 | A1* | 6/2018 | Conole | G06F 16/258 |
| 2019/0130004 | A1* | 5/2019 | Singh | G06F 16/283 |
| 2020/0192662 | A1* | 6/2020 | Hu | G06F 8/427 |
| 2020/0226009 | A1* | 7/2020 | Bachmutsky | G06F 12/10 |
| 2021/0042095 | A1* | 2/2021 | Barman | H04L 41/12 |
| 2021/0329100 | A1* | 10/2021 | Knight | H04L 67/51 |
| 2021/0342293 | A1* | 11/2021 | Waddington | G06F 16/182 |
| 2022/0215948 | A1* | 7/2022 | Bardot | G06N 20/00 |

OTHER PUBLICATIONS

Christian Schmitt et al. "An Evaluation of Domain-Specific Language Technologies for Code Generation"; 2014 14th International Conference on Computational Science and Its Applications—2014 IEEE.*

Qianchuan Ye et al. "A Verified Protocol Buffer Compiler"; In Proceedings of the 8th ACM SIGPLAN International Conference on Certified Programs and Proofs (CPP '19), January 14-15, 2019, Cascais, Portugal. ACM, New York, NY, USA, 12 pages.*

Michal Wegiel et al. "Cross-Language, Type-Safe, and Transparent Object Sharing for Co-Located Managed Runtimes"; OOPSLA/SPLASH'10, Oct. 17-21, 2010, Reno/Tahoe, Nevada, USA.*

Youngsu Son, et al. "Interoperability Marshaller/Unmarshaller"; Samsung Electronics—2012.*

Lethbridge et al., "Merging Modeling and Programming Using Umple", Oct. 2016, pp. 187-197.

"Tesla", GitHub—ExpediaDotCom/tesla, retrieved Oct. 4, 2019 from https://github.com/ExpediaDotCom/tesla, 7 pages.

"Avro Serialization and Deserialization: with Code Generation", retrieved Apr. 10, 2019 from https://data-flair.training/blogs/avro-serialization-and-deserialization/, 7 pages.

Kövesdán et al., "Meta3: A Code Generator Framework for Domain-specific Languages", published Mar. 29, 2018, 19 pages.

Begel et al., "Transformational Generation of Language Plug-ins in the Harmonia Framework", Feb. 2005, 20 pages.

Django "Serializing Django Objects", retrieved on Jan. 11, 2021 from https://docs.djangoproject.com/en/2.2/topics/serialization/, 11 pages.

* cited by examiner

```
// A book.
feature book
    isbn: string
    title: string
    type: book-type
    pages: int // A library.
feature library
    id: long
    name: string
    books: repeated book // Type of book.
enum book-type
    - fiction
    - non-fiction
```

FIG. 4A

```
// A point is the fundamental geometry construct. A point position on the Earth.
@protobuf-field-number-gap(1, 1)
part point extends spatial
    -> ge(.latitude, -90.0)
    -> le(.latitude, 90.0)
    -> ge(.longitude, -180.0)
    -> le(.longitude, 180.0)

// Latitude in decimal degrees. Required.
    latitude: double

// Longitude in decimal degrees. Required.
    longitude: double
```

FIG. 4B

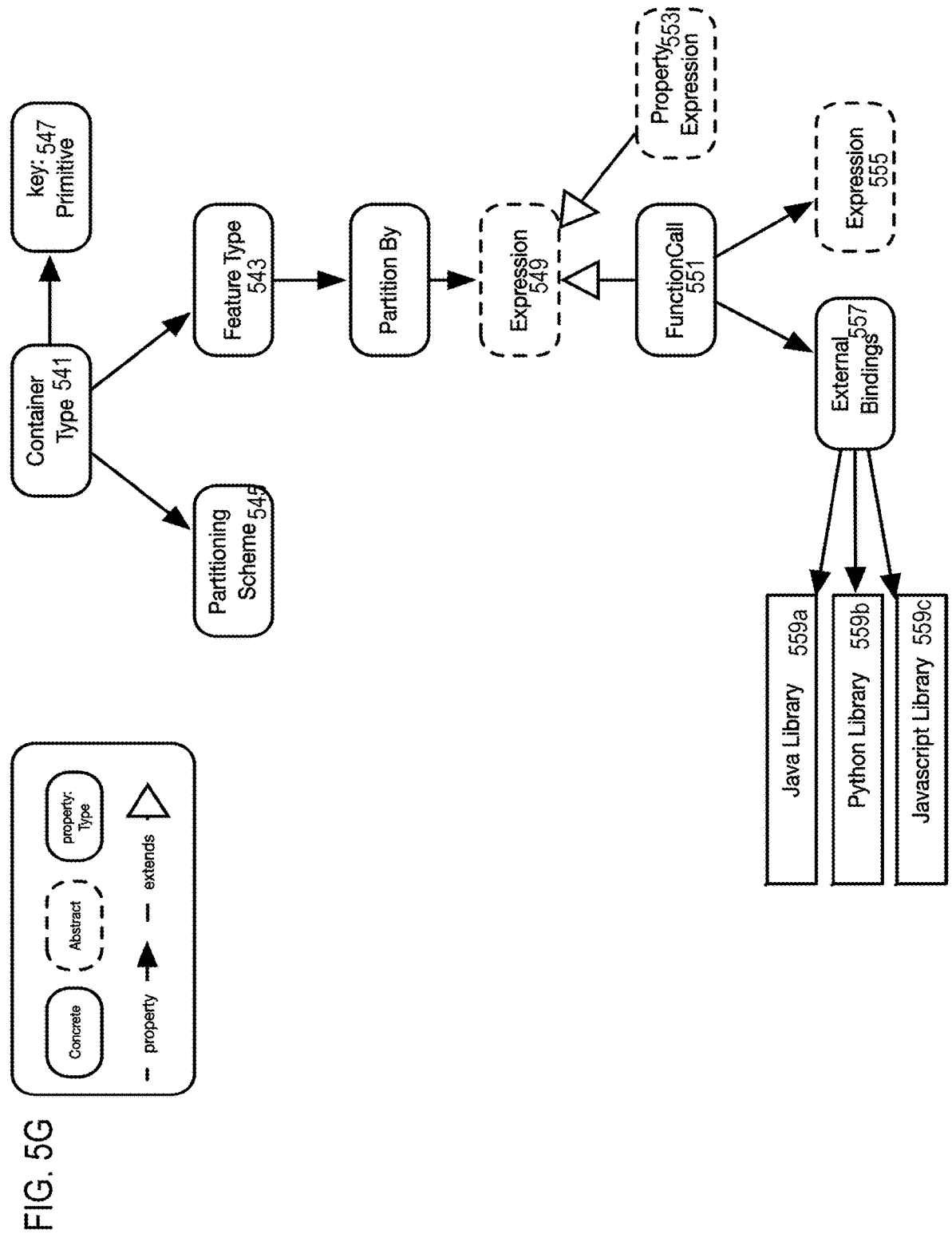

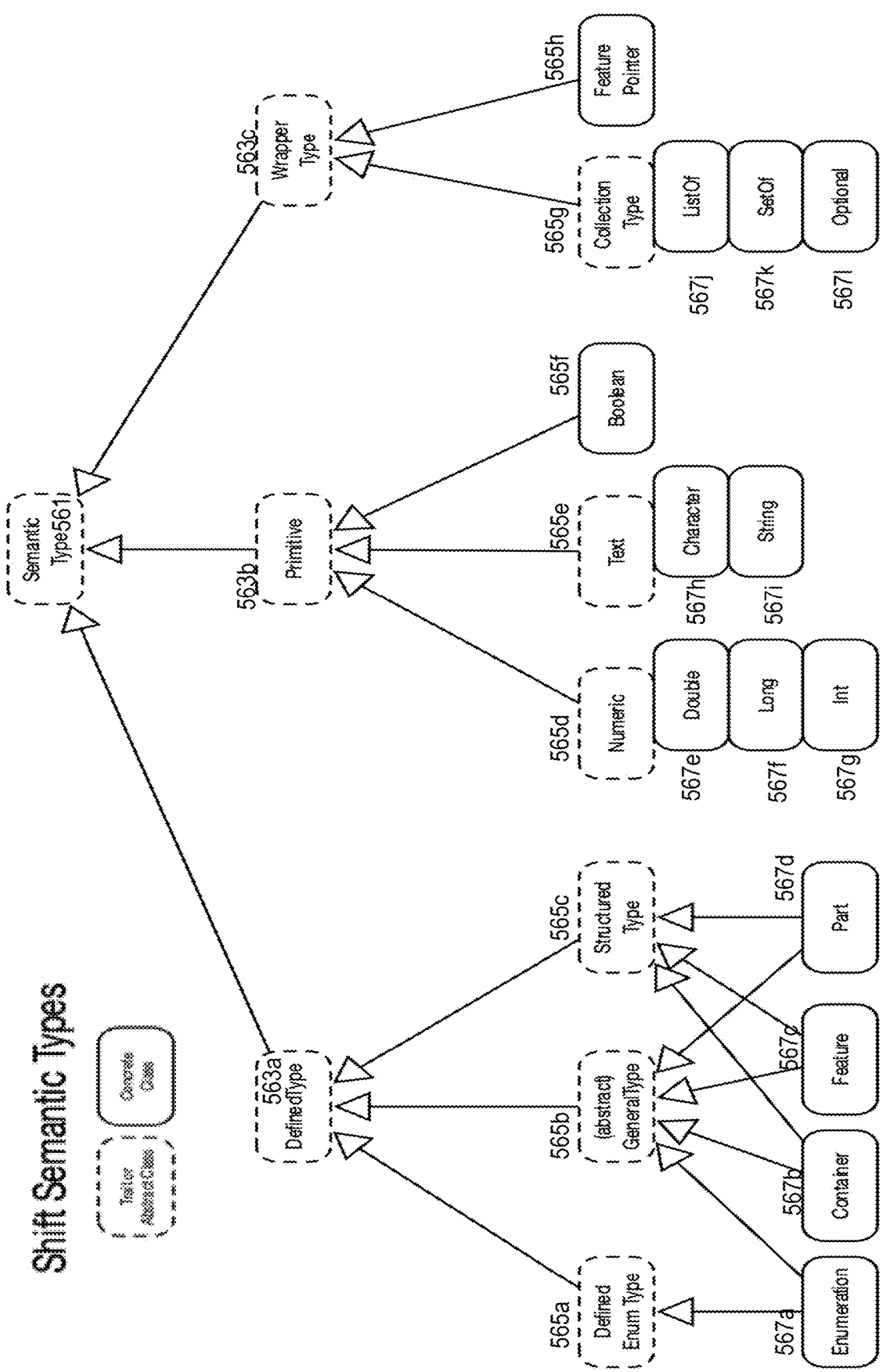

600

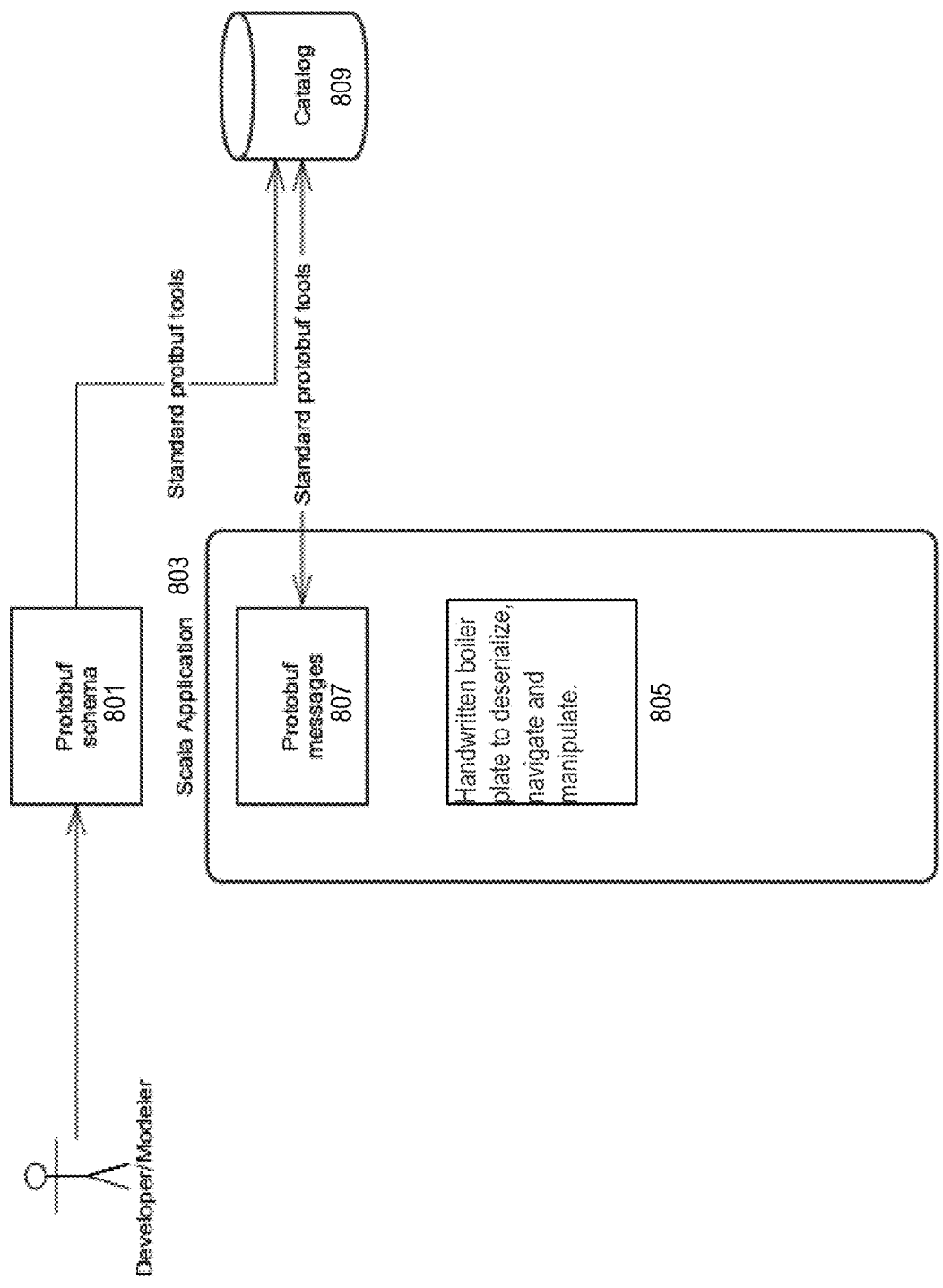

METHOD, APPARATUS, AND SYSTEM FOR PROVIDING A BROKER FOR DATA MODELING AND CODE GENERATION

RELATED APPLICATION

This application claims priority from U.S. Provisional Application Ser. No. 62/925,572, entitled "METHOD, APPARATUS, AND SYSTEM FOR PROVIDING A BROKER FOR DATA MODELING AND CODE GENERATION," filed on Oct. 24, 2019, the contents of which are hereby incorporated herein in their entirety by this reference.

BACKGROUND

Modern services and applications often ingest data from many different sources that may have different serialized and/or in-memory data formats. However, traditional models used for data representation generally do not expose data to services and application in an easy-to-use representation. For example, many of the semantics of the data cannot be represented in the serialized data and must be instead be externally documented. At the same time, the services and applications often have different requirements for in-memory data representations and corresponding code for defining those representations. In addition, serialized data may be optimized for specific storage or transmission use cases in ways that "obscures" the fundamental logical model of the data that is more appropriate for in-memory manipulation by applications and services. As a result, data providers face significant technical challenges to enabling an efficient interchange of data between the data representations and code requirements of different services and applications.

SOME EXAMPLE EMBODIMENTS

Therefore, there is a need for an approach for providing a broker to automatically transform (or "shift") between multiple source data representations and multiple target data representations while maintaining the semantics of the underlying data in both serialized and in-memory representations of the data.

In one embodiment, the broker is based on a novel syntax or modeling language that supports modelling types with rich semantic mechanisms such as inheritance, foreign keys, constraints, etc. The code generator generates code that reflects that modeled structure, as fully as possible for the specific target syntax. Not all targets support the full capabilities of the model, so there is typically some semantic "loss" for any specific target (e.g. Protocol Buffers does not support inheritance; most serialization formats don't support executable constraints, etc.), but the shifting code (the broker) retains full "awareness" of the original model and ensures that the semantics is fully restored when shifting to a fully capable representation (e.g., Java in-memory).

According to one embodiment, a system comprises a syntax for generating a model representing data and semantics of the data. The system also comprises an architecture configured to accept the data according to any of a plurality of data representations. The system further comprises a code generator configured to generate computer code to transform the data between the plurality of data representations by using the model as a broker between the plurality of data representations. The code generator, for instance, supports at least one of a foreign key modeling and resolution, a feature type inheritance, and a constraint language to preserve the semantics of the data during the transforming of the data.

According to another embodiment, a method comprises generating a model representing data and semantics of the data using a syntax. The method also comprises accepting the data in an architecture according to any of a plurality of data representations. The method further comprises generating computer code to transform the data between the plurality of data representations by using the model as a broker between the plurality of data representations. The code generator preserves the semantics of the data during the transforming of the data.

According to another embodiment, an apparatus comprises at least one processor, and at least one memory including computer program code for one or more computer programs, the at least one memory and the computer program code configured to, with the at least one processor, cause, at least in part, the apparatus to generate a model representing data and semantics of the data using a syntax. The apparatus is also caused to accept the data in an architecture according to any of a plurality of data representations. The apparatus is further caused to generate computer code to transform the data between the plurality of data representations by using the model as a broker between the plurality of data representations. The code generator preserves the semantics of the data during the transforming of the data.

According to another embodiment, a non-transitory computer-readable storage medium carries one or more sequences of one or more instructions which, when executed by one or more processors, cause, at least in part, an apparatus to generate a model representing data and semantics of the data using a syntax. The apparatus is also caused to accept the data in an architecture according to any of a plurality of data representations. The apparatus is further caused to generate computer code to transform the data between the plurality of data representations by using the model as a broker between the plurality of data representations. The code generator preserves the semantics of the data during the transforming of the data.

According to another embodiment, an apparatus comprises means for generating a model representing data and semantics of the data using a syntax. The apparatus also comprises means for accepting the data in an architecture according to any of a plurality of data representations. The apparatus further comprises means for generating computer code to transform the data between the plurality of data representations by using the model as a broker between the plurality of data representations. The code generator preserves the semantics of the data during the transforming of the data.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A and 4B are diagrams of example syntax used for data modeling, according to one embodiment;

FIGS. 5A-5J are an example architecture and components of a software development kit for providing data modeling and code generation, according to one embodiment;

FIGS. 8A and 8B are diagrams illustrating before and after system architectures implementing data modeling and code generation, according to one embodiment;

DESCRIPTION OF SOME EMBODIMENTS

Examples of a method, apparatus, and computer program for providing a broker for data modeling and code generation are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
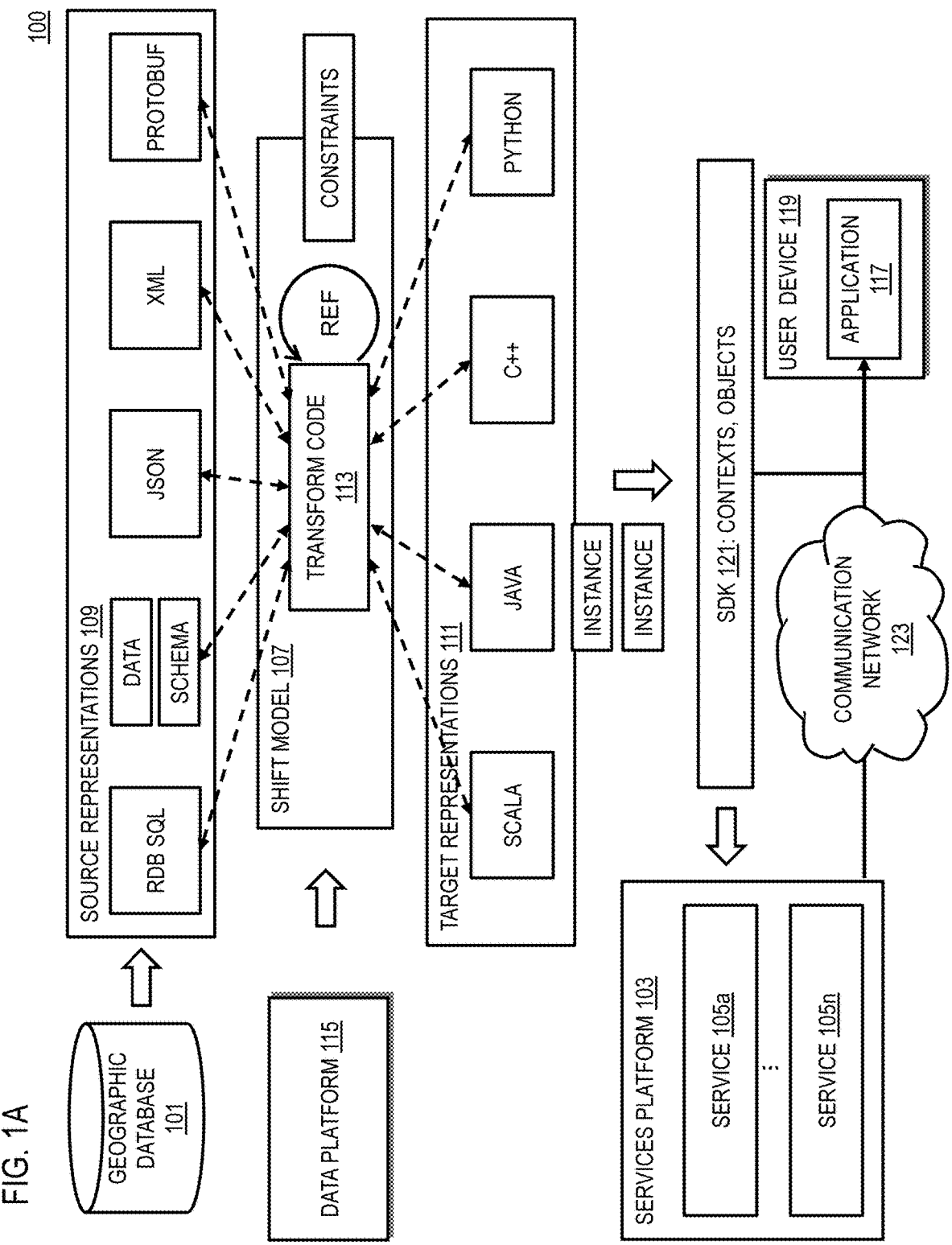
FIGS. 1A and 1B are diagrams of systems capable of providing a broker for data modeling and code generation, according to one embodiment.

FIG. 1A is a diagram of a system 100 for providing a broker for data modeling and code generation, according to one embodiment. Models used for serializing data do not expose data to the application in an easy-to-use representation. Many of the semantics of the data cannot be represented and must be instead documented. This means that developers are forced to write and maintain separate models when working with data and explicitly write code that converts between the two. This becomes a large and wasted cost to engineering for models that are widely used such as map content of the geographic database 101 (e.g., map data and/or other service data provided to support many different mapping, navigation, and other location-based services such as those provided by a services platform 103 and/or any of the services 105a-105n of the services platform 103). Additionally, representing data in a deeply nested document form is cumbersome for some use cases such as analytics.

Most modeling technologies today fall into one of two categories of technical issues:
  (1) The language is too simplistic and leaves a lot to be desired when it comes to describing the semantics of the data set. The generated code from these models ends up not being the models you actually want to work with in the application. Every developer that uses the data ends up writing the same code to, for example, resolve references between object types. Examples: Protocol Buffers, JSON schema.
  (2) The modeling language is robust but there is limited/no tooling for generating code from those models. Code generation tools that do exist are missing support for modern targets such as Protocol Buffers, Scala, and Parquet. Examples: UML, OData.

To address these technical issues, the system 100 introduces a capability to provide a syntax (also referred to as Shift) for modeling data (e.g., to create a Shift data model 107) to broker the transformation or shifting of the data between any one of many possible source representations 109 and any one of many possible target representations of the data. From that model 107, there is an extendable, agnostic architecture for plugging-in numerous code-generated representations (e.g., source representations 109 and target representations 111).

By way of example, supported representations 109 and 111 include but are not limited to any of the following or equivalent: SQL-based relational databases (RDB SQL), JSON, XML, Protocol Buffers (Protobuf), Parquet, and representations supported by computer code languages (e.g., Java, Scala, C++, Python, etc.). It is noted that the representations 109 and 111 listed above are provided by way of example, and any data or schema for representing the data can be used according to the embodiments described herein. In one embodiment, included in the generated code are "Shifters" (e.g., transform code 113 that can move data between the different representations 109 and 111 (e.g., from Protocol Buffers to Java and vice-versa)).

In one embodiment, the data platform 115 uses a standard syntax for the defining the data model which is used as the broker between the other data representations. For example, a data source (e.g., the geographic database 101) can be reversed engineered from its native representation (e.g., one of many source representations 109 supported by the system 100) to the commonly defined syntax and then from this commonly defined syntax to a representation (e.g., one of many target representations 111 supported by the system 100) requested by an end user (e.g., a service or application). In this way, a new representation can be plugged into the extendable architecture of the data platform 115 by providing a translation layer between the new representation and the common syntax.

The various embodiments described herein advantageously provide potential key differences from other code generators:
The system 100 (e.g., via a data platform 115 implementing shift models 107) supports advanced object-oriented concepts such as but not limited to:
Modeling and resolving foreign keys.
Type inheritance between feature types.
A robust constraint language that results in generated code for runtime checks.
The system 100 provides reverse engineering tools that populate a Shift model 107 from existing data sets (e.g., the map data of the geographic database 101).

In one embodiment, the embodiments of the system 100 have any number of use cases such as but not limited to:
Auto-generated, simpler interface for dealing with data in Java and Scala.
Auto conversion of document models represented in Protocol Buffers into a tabular representation (e.g., Parquet) for better integration with the analytic usecase.

In one embodiment, the system 100 (e.g., via a shift data platform 115) is extendable to implement any number of source or target representations 109 and 111. In general, data representations can fall under one of two categories: (1) a serialization format or (2) in-memory application models (classes). Accordingly, any of the source representations 109 can then be transformed or shifted to the target representations 111 in a serialization format and/or in-memory application models (e.g., by generating code for defining the in-memory application model according to a selected computer language environment). Examples of targets include but is not limited to Parquet, PostGIS, Scala, Java, Protocol Buffers, GeoJSON, Python, XML, and C++. The system 100's support for multiple target syntaxes advantageously enables interaction with industry standard tool chains based on data representations standards (e.g., CSV, GeoJSON, ShapeFile, FGDB).

For example, with respect to the examples of Scala, Protobuf, PostGIS, and Parquet, the shift syntax can be mapped as follows:
Scala
Types map to Scala classes
Types extend SDK-defined traits
Type instances managed in a FullContext class
Constraints implemented as executable methods
Protobuf
Types map to protobuf message types
PostGIS SQL & Parquet
Types map to master tables and associated detail tables
The following are example shift code mapped to target code in Scala, PostGIS, and Protobuf:

```
// Shift
feature Library
        name: String
        books: repeated Book
// Scala
case class FlatLibrary (name: String ="", books:
Seq[ShiftFeatureReference] = Nil)
    extends FlatShiftFeature { ... }
case class Library (delegate: FlatLibrary, index: ShiftFeatureIndex)
    extends FullShiftFeature
{
    lazy val name: String = delegate.name
    lazy val books: Seq[Book] =
    delegate.books.map(ref =>
    Book(index.lookup(ref).asInstanceOf[FlatBook], index))
    ...
}
// PostGis
CREATE TABLE LIBRARY (library_id TEXT NOT NULL, name
TEXT NOT NULL,
    PRIMARY KEY(library_id));
CREATE TABLE LIBRARY_TO_BOOKS (library_id TEXT NOT
NULL, index INTEGER
NOT NULL,
    book_id TEXT NOT NULL, PRIMARY KEY(library_id, index));
// Protobuf
message Library {
    string name = 1;
    repeated Reference book_ref = 2;
```

In addition, the system 100 extends to multiple representation formats and storage engines such as but not limited to:
Tabular (e.g., a relational database management system (RDBMS))
Document (e.g., Mongo)
Graph (e.g., Neo4J)

In one embodiment, the output generated using the target representations 111 of the data can be provided to an application 117 executing on a user device 119 (e.g., mobile device, in-vehicle navigation system, computer, etc.). The data can be provided directly or via one or more services (e.g., the services platform 103 and/or services 105) using software development kits (SDKs) 121 (e.g., a Shift SDK framework depicted in FIGS. 5A-5D) with the corresponding contexts, objects, etc. over a communication network 123.

Figure 1B:
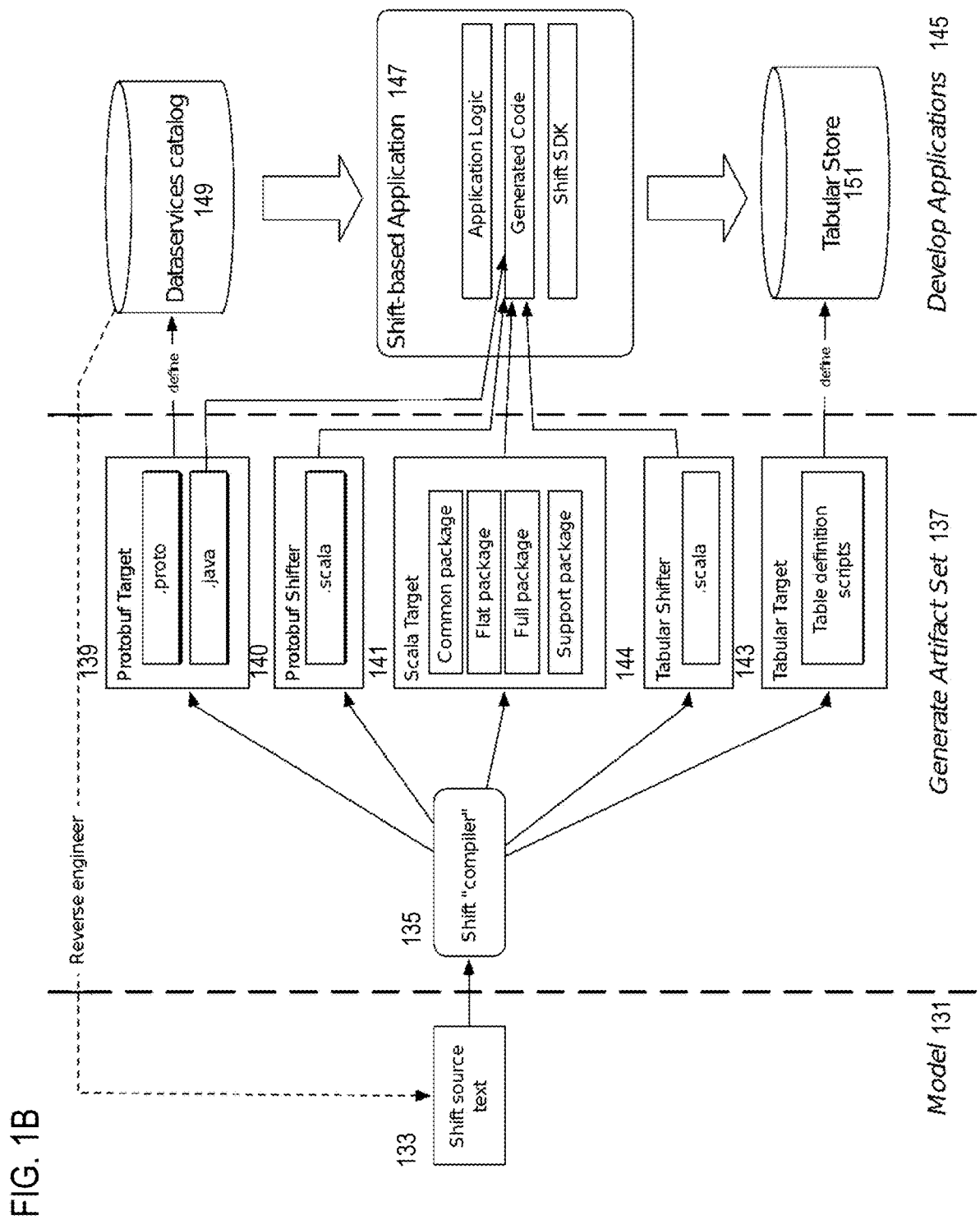

FIG. 1B is a diagram illustrating an example use case of using the shift data platform 115 to broker data between different representations, according to one embodiment. In the example of FIG. 1B, data formatted in a source data representation (e.g., a protobuf model providing, for instance, a Dataservices catalog) is reverse engineered to create a corresponding shift data model 131 (e.g., represented by a shift source text 133 based on the syntax defined by the data platform 115). A shift compiler 135 of the data platform 115 can then be used to process the shift source text 133 (best guess data model of the dataservices catalog) to generate artifact sets 137 for different targets (e.g., Protobuf target 139, Scala target 141, Tabular target 143, etc.). Each of the different targets can include code (e.g., shifter code like Protobuf shifter 140, Tabular shifter 144, etc.) for transforming between data representations using the common syntax as a broker. The shifter or transformer code can then be included in an application 145 (e.g., a shift-based application 147) to transform data from a source data catalog 149 (e.g., the dataservices catalog) into a different representation 151 (e.g., a Tabular Store 151) using the generated shifter code.

By way of example, each target syntax can provide bidirectional conversion with a Scala representation, such as between SQL result set rows and Scala Objects, as well as between Scala objects and Protobuf messages. The following is a Shifter example from SQL to Scala generated code:

In summary, the system 100 introduces a data modeling language (e.g., syntax) that is a high-level semantic data modeling language and "meta-model" (e.g., model that can be used as a broker between other data models or representations). The meta model is used to generate target representations of the data using respect target syntaxes. The transformation or shift is performed by syntax transformers that are generated transformers (a.k.a., generated shifter or transform code) that transforms between target representations. In one embodiment, the system 100 provides generic tooling, reusable models, and reverse engineering to facilitate data modeling and code generation. For example, generic tooling provides generic libraries and frameworks that work with any model. Reusable models can be generated for common models, such as but not limited to spatial and temporal models, along with utility libraries that are stored and then recalled for later use. Reverse engineering includes generated reversed engineered shift models skeletons from existing models in other formats.

Advantages and technical solutions provided by the system 100 include but are not limited to:

```
part Branch ...
feature Book ...
enum LibraryType ...
feature Library
    identifier: String
    name: String
    libraryType: LibraryType
    mainBranch: Branch
    otherBranches: repeated Branch
    catalog: repeated ref Book
def toScala(input: ShiftResultSet): Seq[FlatShiftType] = {
    val rowsSeq = input.toSeq
    ...
    val libraryMap = rowsSeq.collect { case row: ShiftRow if row.tableName.name == "LIBRARY" =>
        row.get[String](ShiftRow.ColumnName("library_id")) -> FlatLibrary(
            otherBranches = {
                val dataCollection = rowsSeq.filter { collectionRow =>
                    collectionRow.tableName.name == "LIBRARY_TO_OTHER_BRANCHES"
                    && row.get[String](ShiftRow.ColumnName("library_id")) ==
                        collectionRow.get[String](ShiftRow.ColumnName("library_id"))
                }
                val collectionData = dataCollection.foldLeft[TreeMap[Int, Int]](TreeMap.empty){
                    (acc, collectionRow) =>
                        acc + (collectionRow.get[Int](ShiftRow.ColumnName("index")) ->
                            collectionRow.get[Int](ShiftRow.ColumnName("other_branches_id")))
                }
                collectionData.map { case(_, collectionData) => branchMap(collectionData)}
            },
            catalog = { ... },
            identifier = row.get[String](ShiftRow.ColumnName("library_id")),
            name = row.get[String](ShiftRow.ColumnName("name")),
            main Branch = branchMap(row.get[Int](ShiftRow.ColumnName("main_branch_id"))),
            libraryType = row.get[String](ShiftRow.ColumnName("library_type")) match {
                case valueLibraryType: String if valueLibraryType == "Public" => LibraryType.Public
                case _ => LibraryType.Private
            }
        )
    }
}
...
```

In one embodiment, the system 100 can be used to ingest customer data (e.g., using a different data representation) into, e.g., the geographic database 101. For example, a customer (e.g., automobile Original Equipment Manufacturer (OEM)) may have a list of OEM specific points of interest (POIs) in a tabular format that is to be ingested into the geographic database 101. The system 100 can use the shift data platform 115 to transform the OEM data into a representation used by the geographic database 101 according to the embodiments described herein.

Figure 2:
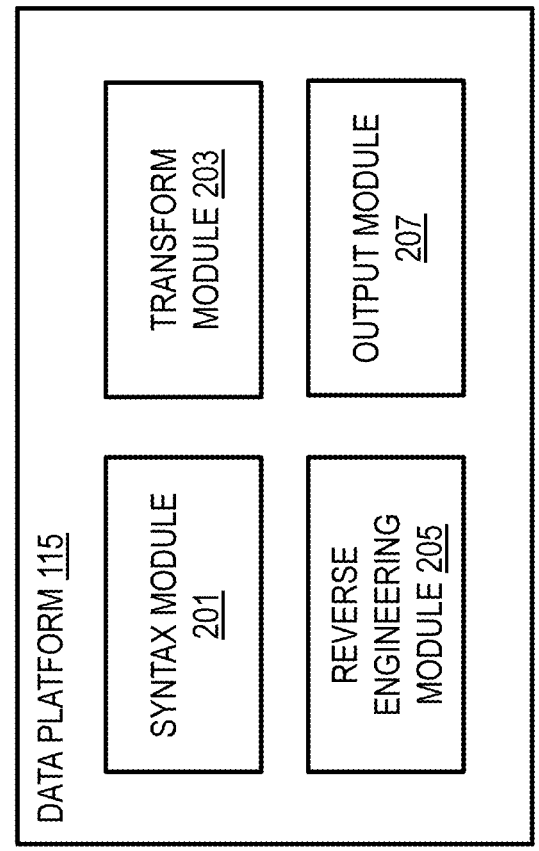
FIG. 2 is a diagram of components of a data platform, according to one embodiment.

Rich semantic modeling language (target independent)
Code generation for multiple target syntaxes
Ergonomic in-memory representation
Bi-directional conversion between representations
Support for generic frameworks and utility libraries Moreover, the system 100 can be a productivity amplifier because the system 100 can result in the following:

Eliminates hand-written, expensive, repetitious, error-prone, boiler-plate deserialization code
Provides a comprehensive generated code base embedded in a rich framework that works with standard tools In one embodiment, the use cases for the shift data platform 115 can include but is not limited to the following end users:

Application Developer
  Use an existing Shift model and associated artifacts to build an application. Leverage:
  Multiple target representations and transformers
  Generic tooling and frameworks for Data Processing (e.g., Distributed Data Processing), Validation, in-memory deserialization
  Utility libraries for shared models such spatial or temporal types
Tool Developer
  Develop new generic tools and frameworks for Shift generated code
Model Developer
  Develop a new model from scratch
  Reverse engineer a model from an existing data set
Syntax Developer
  Develop a variant of an existing target syntax
  Develop a full new syntax for a storage format or programming language FIG. 2 is a diagram of components of a data platform 115 capable of providing a broker for data modeling and code generation, according to one embodiment. In one embodiment, the data platform 115. As shown in FIG. 2, the components include a syntax module 201, a transform module 203, a reverse engineering module 205, and an output module 207. It is contemplated that the functions of these components may be combined or performed by other components of equivalent functionality. Moreover, it is contemplated that the data platform 115 needs not include all of the modules 201-207. The above presented modules and components of the data platform 115 can be implemented in hardware, firmware, software, or a combination thereof. In another embodiment, the data platform 115 and/or one or more of their modules 201-207 may be implemented as a cloud-based service, local service, native application, or combination thereof. The functions of the data platform 115 modules 201-207 are discussed below.

Figure 3:
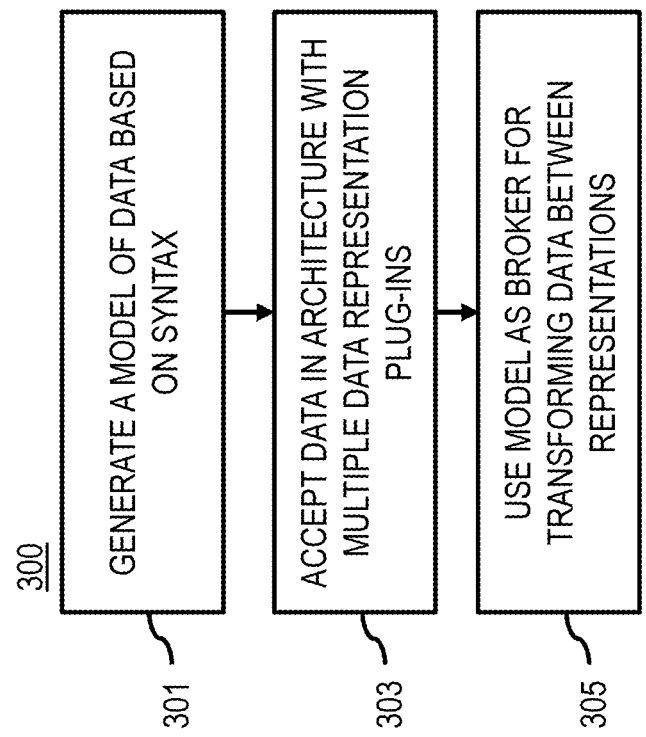
FIG. 3 is a flowchart of a process for providing a broker for data modeling and code generation, according to one embodiment.
Figure 11:
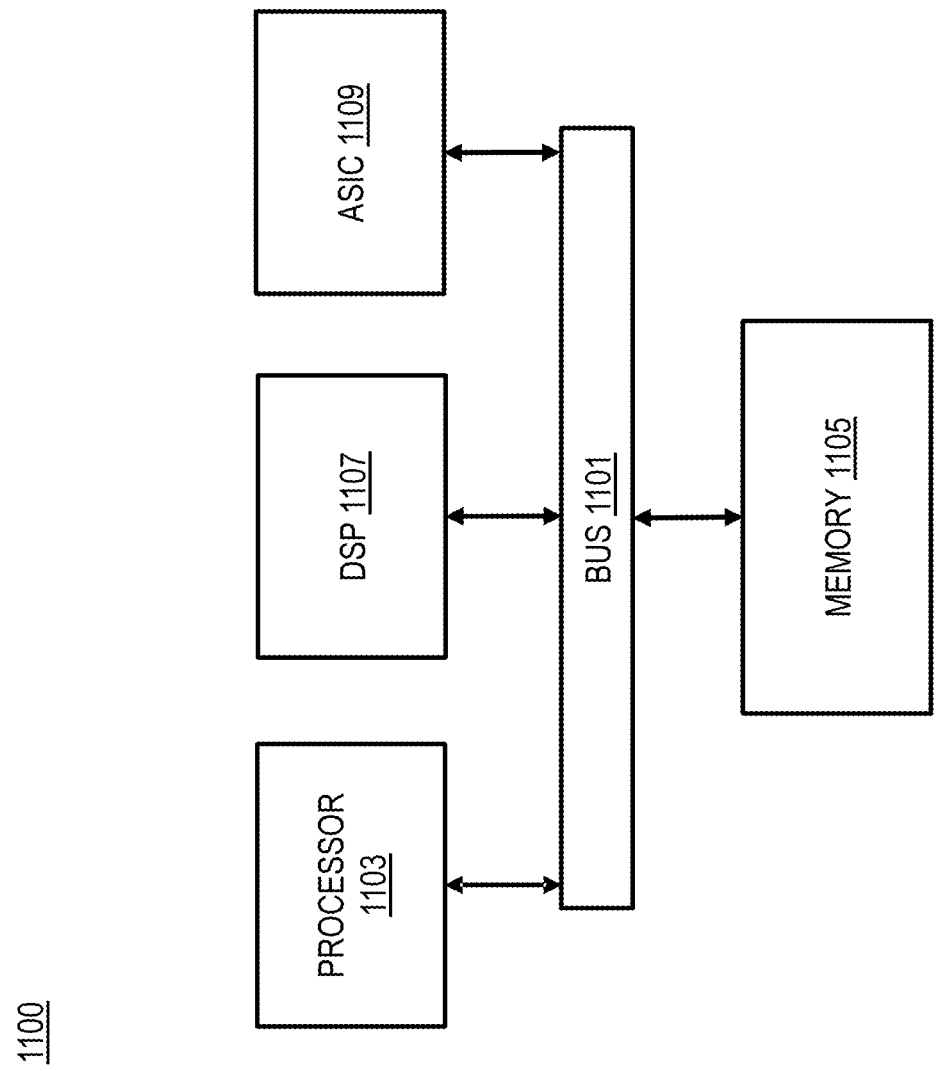
FIG. 11 is a diagram of a chip set that can be used to implement an embodiment.

FIG. 3 is a flowchart of a process for providing a broker for data modeling and code generation, according to one embodiment. In various embodiments, the data platform 115 and/or any of the modules 201-207 may perform one or more portions of the process 300 and may be implemented in, for instance, a chip set including a processor and a memory as shown in FIG. 11. As such, the data platform 115 and/or any of the modules 201-207 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

In step 301, the syntax module 201 provides a syntax for generating a model representing data and semantics of the data. In one embodiment, the syntax is a domain specific language (DSL) (also referred to as Shift DSL). The Shift DSL is language agnostic. Examples of the syntax or DSL is illustrated in FIGS. 4A and 4B. For example, as shown, the Shift DSL or syntax includes elements such as but not limited to:
Model (e.g., library)
Package (e.g., com/here)
Feature (e.g., book)
Property (e.g., isbn, title, type, pages)
Primitive Types (e.g., string, int)
Collection (e.g., repeated)
Feature Pointers (e.g., repeated book)
Enumeration (e.g., book-type)
Documentation (e.g., //A book.)

Additionally, the syntax or high-level data modeling language includes features such as but not limited to:
First class references
Primary keys
Expressive constraint language
Collection types
Portable DSL (as well as Scala API, etc.)
Command line tools
Inheritance for reuse
Partitioning and layering decoupled from core logical data
Annotation for syntax-specific hints In one embodiment, the shift command line tools take the Shift DSL model as input, parse the model, and generate a set of artifacts under an output root directory. The artifacts can include Scala target source files, Scala source files for protobuf, PostGIS, and Parquet shifters, Protobuf.proto files, Protobufjava bindings (generated with protoc), PostGIS and Parquet schema creation scripts, etc.

In other words, the syntax of the system 100 provides a logical abstraction of the data being modeled. For example, the syntax can include structural types. Based on these modeling elements (e.g., structural types), the system 100 can provide a modest but practical set of primitive types and collections. The syntax can also provide properties and structure hierarchy. These elements, for instance, map naturally to identified target syntaxes. The syntax also provides for explicit references so that the syntax clearly distinguishes between "has" properties (e.g., owns and controls) versus "point at" properties (e.g., foreign references). The annotations can also help to decouple the core model from syntax specific hints, and the container types decouple the core logical model from partitioning and layering semantics (e.g., often used in hierarchical tile-based map data such as the geographic database 101).

In addition, the shift syntax or expression language support:
Explicit reference semantics
Collections
  List (with distinct, ordered semantics), Optional
Constraint Language
  Supports
    Path Expressions
    Numeric, Text, and Logical operators
    Collection operators
    Quantified Expressions (there-exists, for-all)
  Executable target syntaxes such a Scala and Java.
    Example uses: A validating filter; precondition check on input, postcondition checks on output.
Precise documentation across all targets In step 303, the transform module 203 provides an architecture configured to accept the data that is to be model according to any of a plurality of data representations (e.g., as discussed in the embodiments above). Then in step 305, the transform module 203 can include a code generator configured to generate computer code to transform the data between the plurality of data representations by using the model as a broker between the plurality of data representations. The code generator, for instance, can use a foreign key modeling and resolution, a feature type inheritance, a constraint language to preserve the semantics of the data during the transforming of the data, etc. For instance, a constraint is a concept which can be orthogonal to inheritance, such as a constraint on a single object irrelated to anything. By way of example, a component of an object representing a physical quantity that needs to be compliant with a range, such as a human height being positive (an example of a constraint orthogonal to inheritance).

One aspect of the data brokering/transformation embodiments described herein is the definition of references (foreign keys). This enables in-memory application models to resolve these references for a user. For example, in a serialized target, a "Link" feature will just have a "Node" reference by ID. In the Java/Scala targets, this reference is followed, and the API provides a method on Link to directly retrieve the Node. Defining these relationships between features is important for generic tooling. For example, a function that deletes a feature can now also delete all dependent features.

In one embodiment, Annotations are an extendable feature of the system 100 that support controlling transformations for a target. When a target is implemented, new target-specific annotations can also be introduced. A couple examples for the Protocol Buffers target include but are not limited to:

@protobuf-field-number-gap: This controls the numbering of fields in Protocol Buffers which is important for reverse engineering models.

@protobuf-pool-type: This enables the "pooling" of a type, which is a data normalization technique to compresses the data to the top level of a partition.

In one embodiment, constraint expressions allow defining path-based semantics on a data model. These constraints are then included in the executable targets (e.g., Java) and can be enforced. As each constraint can be named, they also serve as documentation. Constraints support equality operators (==, !=), comparison operators (<, >), logical operators (and, or), logical quantifiers (all, exists, filter), collection operators (size, isEmpty, head, tail), numeric operators (sum, diff), and more.

In another embodiment, container types are included in the model as a means to group content. This supports the use-case of distributed data, in which it is beneficial for Spark applications to systematically layer and partition data. With containers, this partitioning is built into the model and is machine interpretable.

In yet another embodiment, the shift data platform 115 contains predefined types including temporal types and spatial types. Including these types enables generic tooling to be built on top of any Shift data model. For example:

An application that aggregates windows of streaming data based on their temporal type.

An application that partitions data into partitions of map data based on their spatial type.

An application that map matches data to road geometries based on the spatial type.

The shift data platform can also comprise SDK libraries and frameworks to provide for data transformations on a per target basis. For examples, as shown the architecture and components in FIGS. 5A-5G and the example Scala SDK of FIG. 6, the shift data platform 115 can include a Scala SDK that defines:

Abstract traits extended by the generated classes

Frameworks based on the abstract traits

Figure 5A:
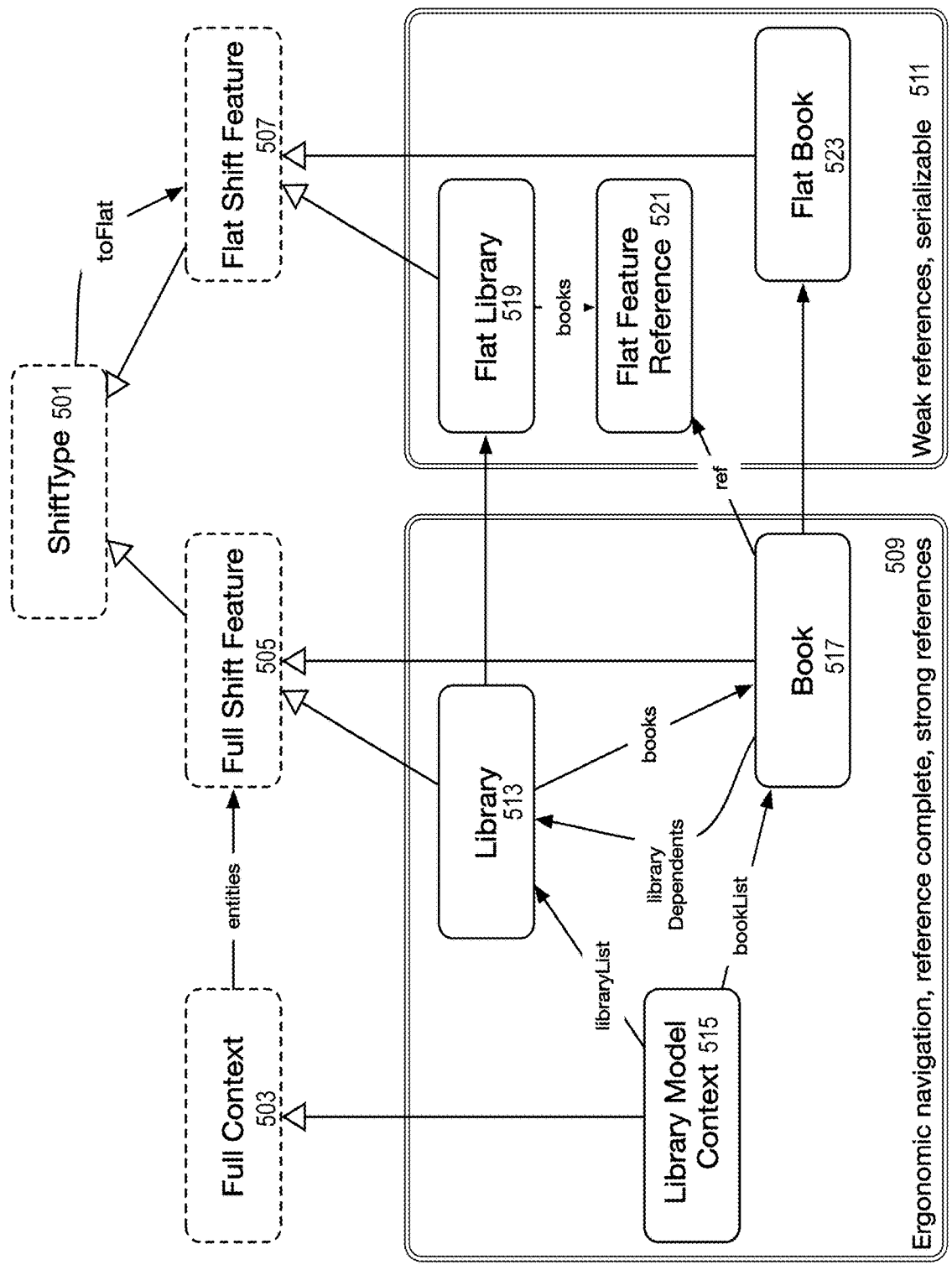

In FIG. 5A, the Shift SDK framework includes Scala abstract traits, full and flat features (e.g., ShiftType 501, Full Context 503, Full Shift Feature 505, and Flat Shift Feature 507) to broker between an ergonomic navigation and reference complete data representation 509 with strong references and a serializable data representation 511 of weak references. By way of example, the Library Model includes Library, Branch, Book. In this example, the data representation 509 includes Library 513, Library model Context 515, and Book 517, the data representation 511 includes Flat Library 519, Flat Feature Reference 521, and Flat Book 523, and the SDK generated Scala classes extend SDK traits as below:

```
model library-model
    feature library
        name: string
        books: repeated books
    feature book
        isbn: string
        title: string
        author: string
```

In one embodiment, the SDK traits also provide common semantics such things as, but not limited to:

Bidirectional traversal of the reference graph (references <-> dependents)

Conversion between serializable forms (flats) and in-memory, reference complete, forms (fulls)

Partitioning and layering

Figure 5B:
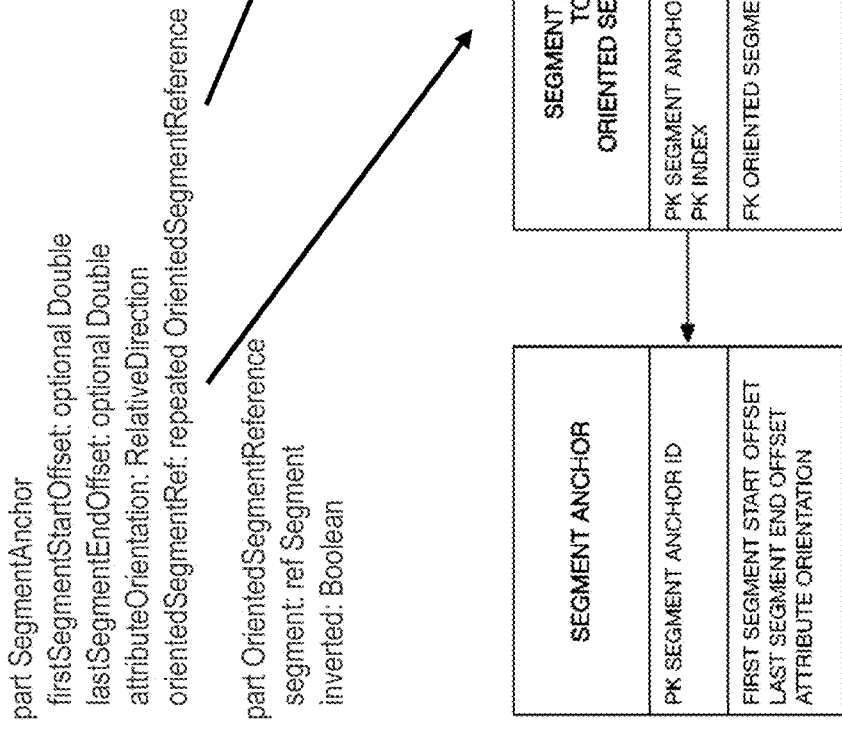

Further, the Shift SDK framework (i.e., an example SDK 121 of FIG. 1A) provides building block for items such as but not limited to:

Data Processing or Distributed Data Processing Client (e.g., a Spark client) that resolves the full in-memory context Others are possible, e.g., a validation client, model mapping More details of DSL examples, command line tools, generated artifacts, as well Parquet instance populated from rib-2 catalog using a map-content-subset model will be described in conjunction with FIGS. 5B-5J. For instance, the subset can include Segments, Functional Class, and advanced driver-assistance systems (ADAS) attribution, a Shift tool chain can populate Parquet instances in two hours from a global map content catalog, and a customer relevant query runs in two minutes. FIG. 5B shows examples of target SQL additions of the Shift SDK framework.

Figure 5D:
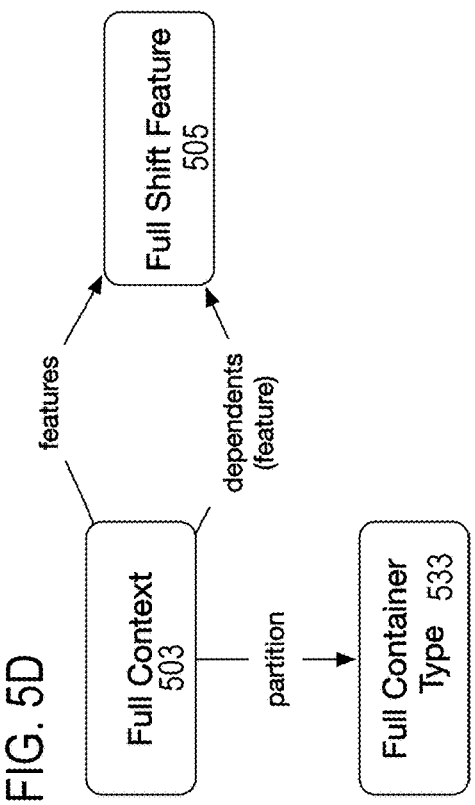
Figure 5C:
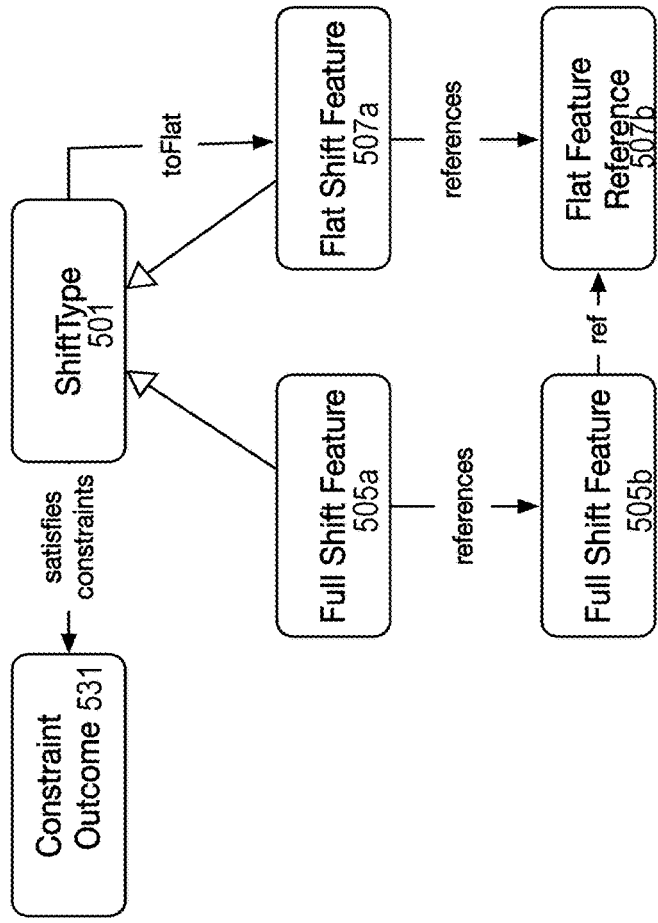

FIG. 5C shows more details of the relationships among ShiftType 501, Full Shift Features 505, and Flat Shift Features 507. Not only the Full Shift Features 505a, 505b or the Flat Shift Features 507a, 507b can reference within themselves, but also the Full Shift Features 505a, 505b can reference to the Flat Shift Features 507b. FIG. 5C also shows ShiftType 501 satisfying constraints becomes Constraint Outcome 531. The following are Scala abstract traits, full and flat features of the Shift SDK framework depicted in FIG. 5C.

```
trait ShiftType {
    def satisfiesConstraints: ConstraintOutcome
    def toFlat: FlatShiftType
}
case class ConstraintOutcome(violatedConstraints: List[String])
trait FlatShiftFeature extends ShiftType {
    def references: Iterable[FlatFeatureReference]
}
trait FlatFeatureReference {
    val identifier: Any
    val refType: Class[_ <: FlatShiftFeature]
}
trait FullShiftFeature extends ShiftType {
    val references: Iterable[FullShiftFeature]
```

```
        def ref: ShiftFeatureReference
    }
```

FIG. 5D shows more details of the relationships between Full Context 503 and Full Shift Features 505. In addition, Full Context 503 can be partitioned into Full Container Type 533. The following is Scala FullContext of the Shift SDK framework depicted in FIG. 5D.

```
trait FullContext {
    val features: Seq[FullShiftFeature]
    def lookup(ref: ShiftFeatureReference): FullShiftFeature
    def contains(ref: ShiftFeatureReference): Boolean
    def dependents(feature: FullShiftFeature):
        Seq[FullShiftFeature]
    // FUTURE
    def partition: Seq[FullShiftContainer]
}
```

Figure 5F:
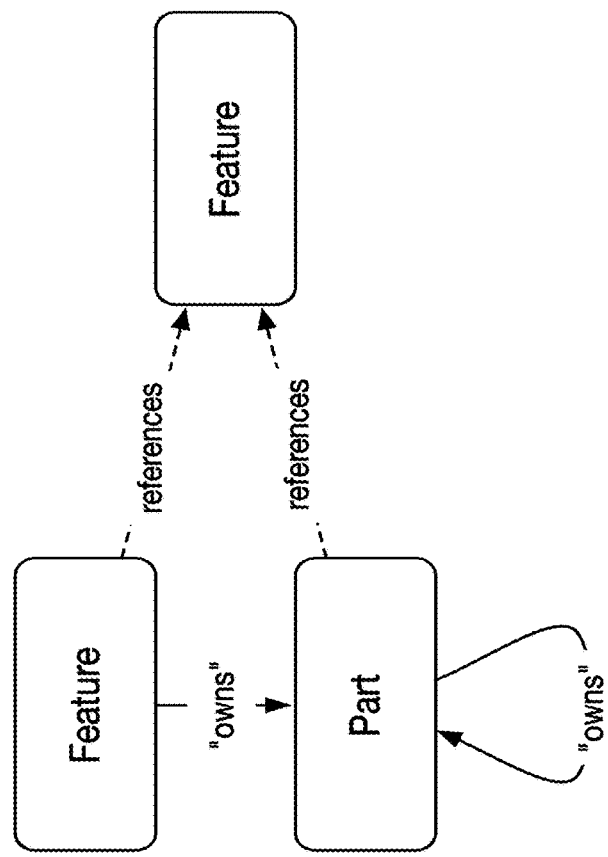
Figure 5E:
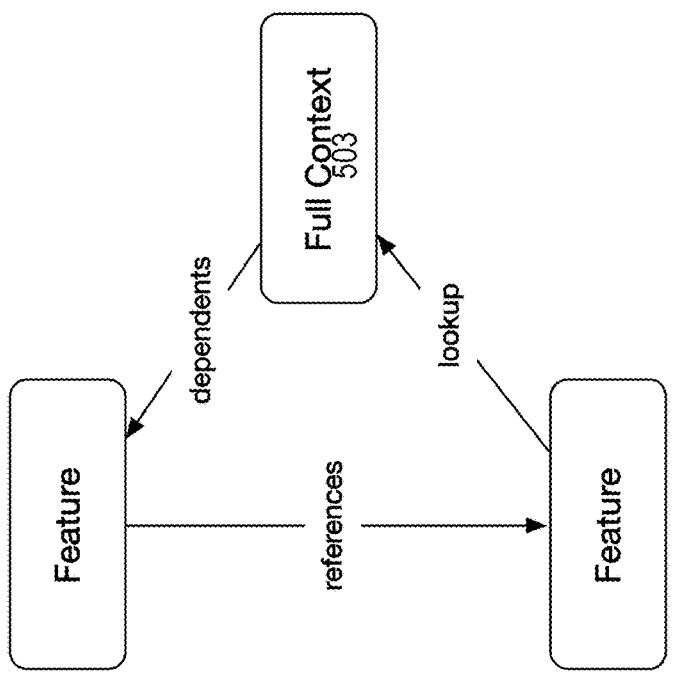

An example reference graph traversal of FullContext 503 is depicted in FIG. 5E, which is bidirectional, transitive (multi-level), generic (common to all models) including Forward: Feature.references and Reverse: FullContext.dependents, and has named variants generated for specific models. For example, Library references Book references Author. The generated Scala class for Author has two methods which filter dependentEntities:
1. Context.authorList, Context.bookList, Context.libraryList
2. Library.books, Book.authors
3. Author.dependentBookTypes: Seq[Book]
4. Author.dependentLibraryTypes: Seq[Library]

In one embodiment, a ContextCompiler is extended in the Shift SDK framework as follows, wherein the underscored italic names refer to generated elements, Line 10 defines a custom compile function, Line 11: context.segmentList is all segments in the context, Line 12: segment.functionalClassAttributesDependents is all FunctionalClassAttribute instances that reference segment, Line 17: Scala partition is created from selected segments, and Line 18: HmcShift converts the Scala partition to a protobuf message.

```
01   // Filter HMC function class 2 segments.
02   class FunctionalClassCompiler(context: CompilerContext)
03       extends ContextCompiler(context, HmcContext, HmcShift) {
04
05       override def subjectLayers: Seq[(Catalog.Id, Layer.Id)] =
             Seq((InCatalog, InLayerRoad))
06       override def inLayers: Map[Catalog.Id, Set[Layer.Id]] =
07           Map(InCatalog -> Set(InLayerRoad, InLayerTopology))
08       override def outLayers: Set[Layer.Id] = Set(OutLayer)
09
10       override def compile(implicit context: HmcContext):
             Option[Payload] = {
11           val fc2Segments = context.segmentList.filter { segment =>
12               segment.functionalClassAttributeDependents
13                   .map(_.functionalClass)
14                   .contains(FUNCTIONAL_CLASS_2)
15           }
16
17           val partition = TopologyGeometryPartition(segment =
                 fc2Segments)
18           val proto = HmcShift.toTarget(partition)
19           Some(Payload(proto.toByteArray))
20       }
21   }
22
23   object FunctionalClassCompiler {
24       val InCatalog = Catalog.Id("rib")
25       val InLayerRoad = Layer.Id("road-attributes")
26       val InLayerTopology = Layer.Id("topology-geometry")
27
28       val OutLayer = Layer.Id("demo-2")
29   }
```

Figure 6:
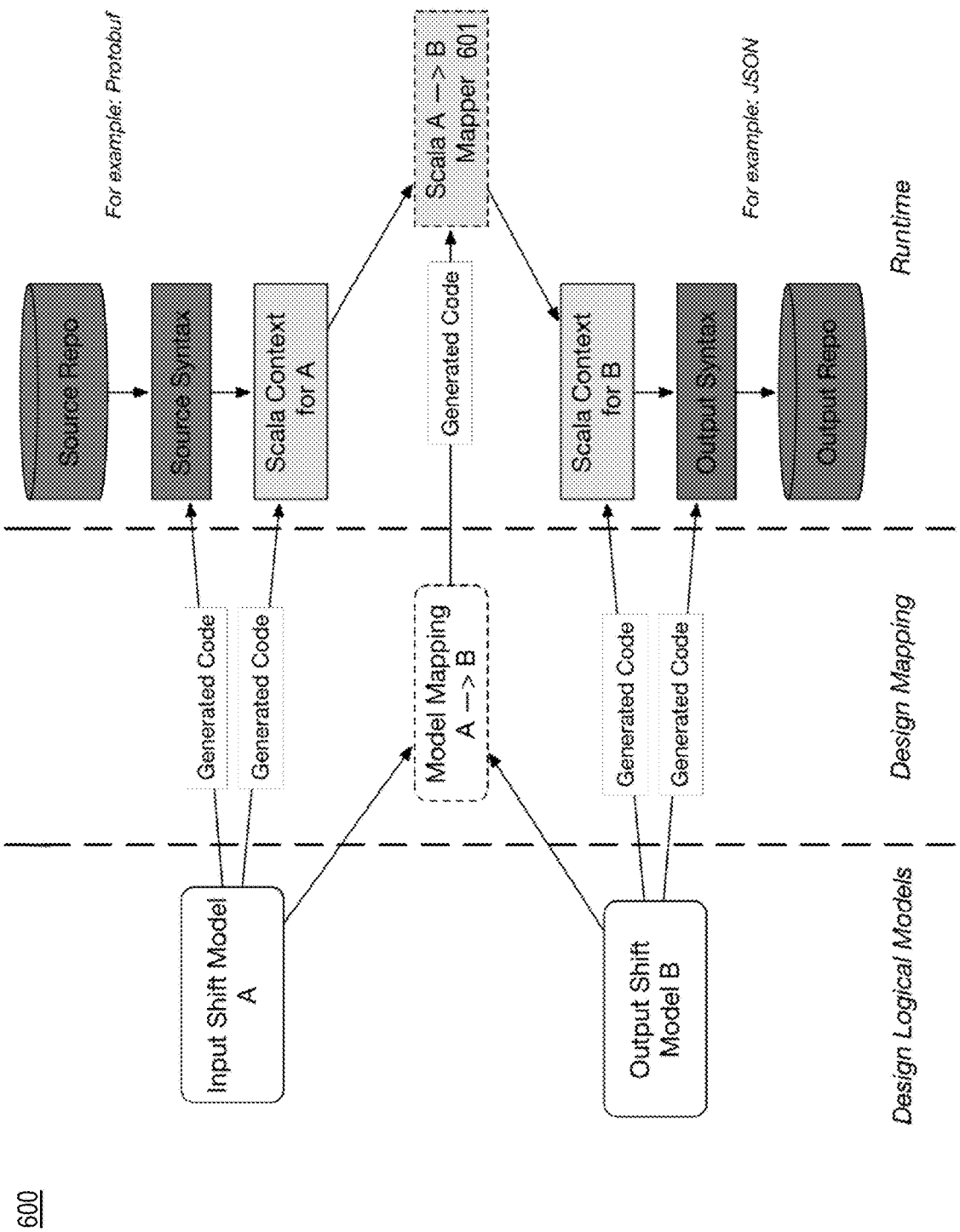
FIG. 6 is an example Scala software development kit for providing data modeling and code generation, according to one embodiment.

The example Scala SDK mapping model 600 of FIG. 6 maps data from an input Shift model A (e.g., any protobuf model) to an output Shift model B (e.g., any XYZ's Map Object model such as JSON) via Model Mapping A->B (e.g., a Scala A->B Mapper 601). The Scala SDK mapping model 600 can support rich semantics such as protobuf using references, and optionality, richer collection semantics, multi-property semantics, inheritance, executable documentation, etc. The Scala SDK mapping model 600 keeps semantics untouched between the different representations, and gets the semantic back at run-time for a representation of interest. The Scala SDK mapping model 600 can plug in new modules for additional representations to expand the Shift eco-system, such as GeoJSON, PostGIS, etc. The Shift model saves developer time resources by automate optimal serialization and provide high-level views of abstract objects code.

Figure 7:
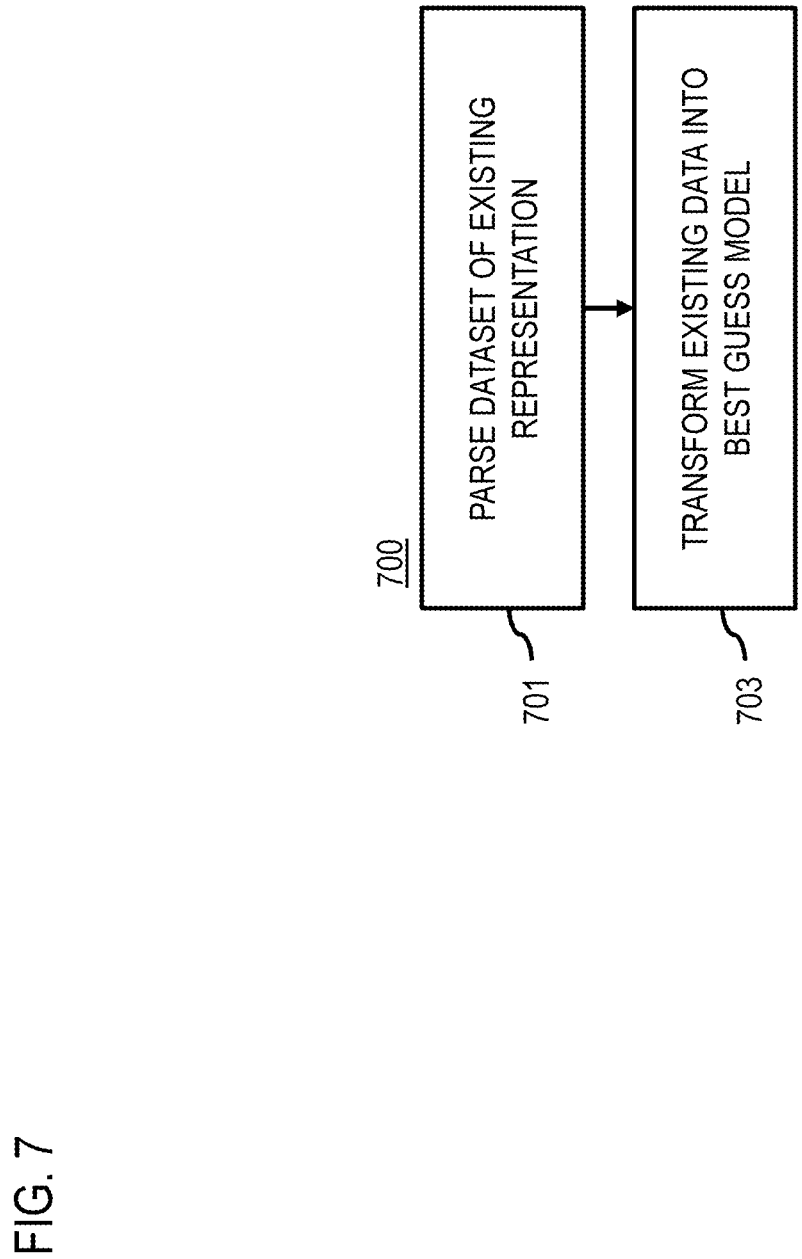
FIG. 7 is a flowchart of a process for reverse engineering data, according to one embodiment.

FIG. 7 is a flowchart of a process for reverse engineering data, according to one embodiment. In various embodiments, the data platform 115 and/or any of the modules 201-207 may perform one or more portions of the process 700 and may be implemented in, for instance, a chip set including a processor and a memory as shown in FIG. 11. As such, the data platform 115 and/or any of the modules 201-207 can provide means for accomplishing various parts of the process 700, as well as means for accomplishing embodiments of other processes described herein in conjunction with other components of the system 100. Although the process 700 is illustrated and described as a sequence of steps, it is contemplated that various embodiments of the process 700 may be performed in any order or combination and need not include all of the illustrated steps.

In one embodiment, reverse engineering tools are provided in order to transform existing models into a model based on the syntax defined in the embodiments above (e.g., a broker model). The data platform 115 can include extendable plugins to the support the reverse engineering of any number of data representations (e.g., Protocol Buffers, CSV, and/or the like). By way of example, reverse engineering creates a skeleton shift model from a source model by extracting as much semantics as possible from the source model. To help with the extraction configuration hints can be optionally provided to enhance the extraction of the semantics.

In step 701, the reverse engineering module 207 parses and interprets the input models. In step 703, the reverse engineering module 207 uses the parsed and interpreted input models to create a best-guess model using the syntax of the system 100. In cases where the input models use representations that solutions are not as robust as the syntax of the system 100, the reverse engineering module 205 can infer or define some information for creating the best guess model through configuration. For example, the Protocol Buffer reverse engineering tool can have a default configuration that any field of with "_ref" suffix is a reference—for example, "xyz_ref" is a reference to an Xyz feature.

In one embodiment, the best guess model (e.g., skeleton model) can be further tuned by providing semantic additions, references, optionalities, constraints, etc. The tuning can be performed manually by a model developer. However, it is also contemplated the tuning can be performed automatically using machine learning or other equivalent artificial intelligence approaches.

Examples of reverse engineering include but are not limited to the following:
  CSV files to a rudimentary Shift model.
  Set of protobuf message to a slightly less rudimentary shift model.
  Relational schema to Shift model leveraging any primary keys, foreign keys, and constraints.

In one embodiment, the shift model 107 can be defined as:
  A Model is a named set of Defined Types.
  A defined Type has Properties.
  A defined Type has Constraints.
  A Property has a Name and a Type.

In one embodiment, Models, Types, and Properties can carry Annotations and Documentation. In addition, Annotations can provide some fine tuning for target syntax generation. By way of example, a shift model 107 comprises:
  A root package
  A set of types
  Imported models
  Annotations In one embodiment, the system 100 can supplement a shift model 107 with additional types, properties, constraints, semantics etc., to extend a shift model 107 while still reusing existing tooling built around the original model. By way of example, the system 100 can provide a customer with bring-your-own-data an existing type (e.g., a road feature) with additional properties of the customer's own design. As another example, the system 100 can supplement services/applications an existing type with additional constraints/semantics.

Figure 8B:
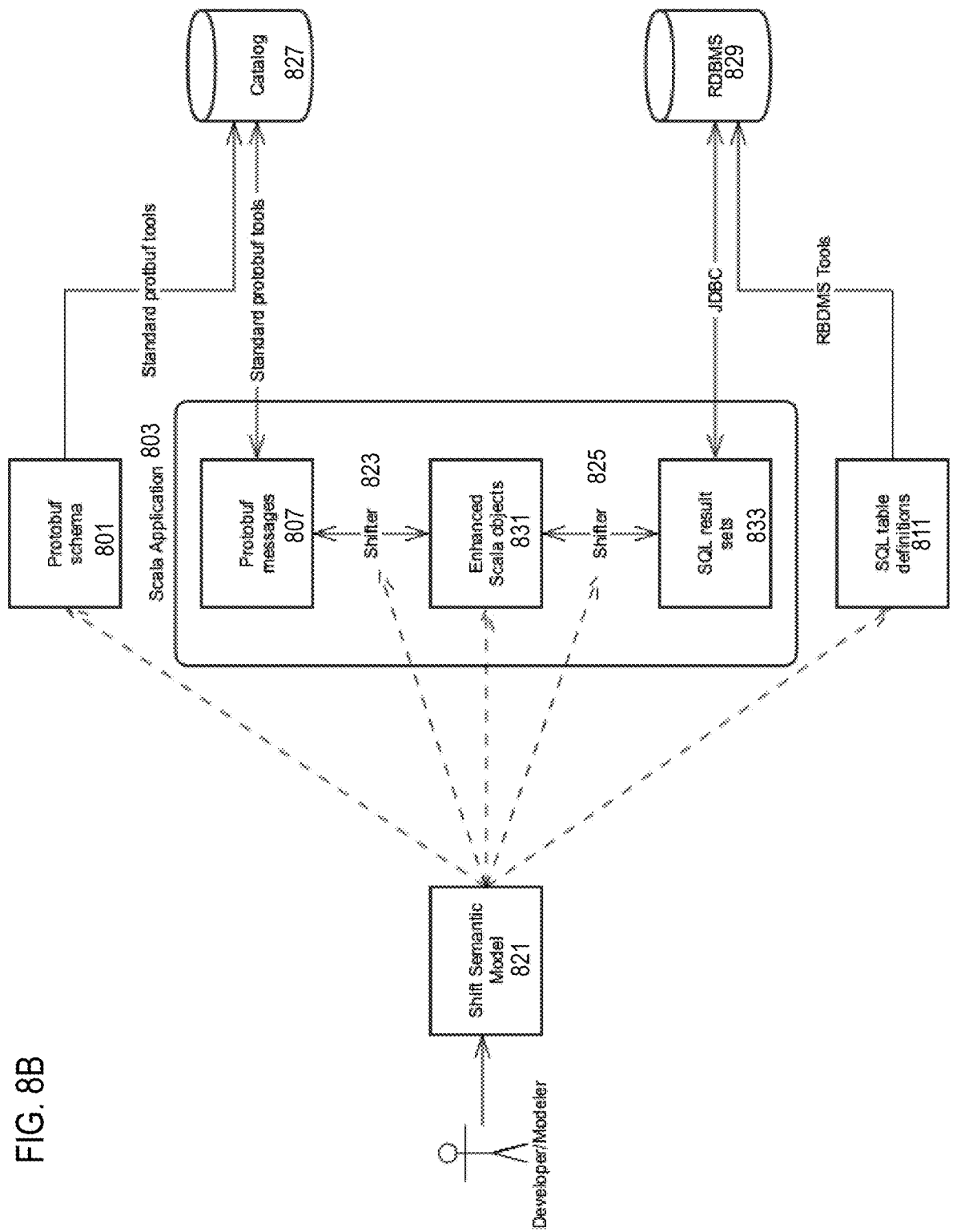

FIG. 8A illustrates an example data system before applying embodiments of the data shift or transformation approach described herein, and FIG. 8B illustrates the data system after applying the embodiments. Models used for serializing data do not expose data to the application in an easy-to-use representation. Many of the semantics of the data cannot be represented and must be instead documented. This means that developers are forced to write and maintain separate models (e.g., Protobuf schema 801, a Scala application 803, and SQL table definitions 811) when working with data and explicitly write code (e.g., a handwritten boiler plate 805 to deserialize, navigate and manipulate) that converts between Protobuf messages 807 and Scala objects, and then copy the content to a catalog 809. This becomes a large and wasted cost to engineering for models that are widely used, such as HERE Map Content (HMC) of the HERE Platform. Additionally, representing data in a deeply nested document form is cumbersome for some use cases (e.g., analytics).

FIG. 8B demonstrates how a Shift semantic model 821 and shifters 823, 825 can create a catalog 827 and a RDBMS 829. The Shift semantic model 821 provides enhanced Scala objects 831, and can use the shifter 823 to facilitate bidirectional conversion between Protobuf messages 807 and the enhanced Scala objects 831, and then copy these contents to the catalog 827. The Shift semantic model 821 can also use shifter 825 to facilitate bidirectional conversion between the enhanced Scala objects 831 and SQL result sets 833, and then copy these contents to the RDBMS 829.

In one embodiment, a shift model 107 is: (1) a unit of "compilation" and deployment, (2) a unit of reuse, and/or (3) dictates the target files for the generated code.

In one embodiment, a shift model 107 can have a shift type. By way of example, a shift type is either defined or built in. Defined types are defined by a model developer. Built-in types are baked or pre-configured into the system 100. Examples of built-in types include but are not limited to:
  Primitive: numeric, text, Boolean
  Collections: List, Set, Optional
  Feature Pointer
  Defined types can exhibit one or more of the following properties:
  Have a package and a name
  May have properties
  May have constraints
  May have a set of key properties
  May extend another defined Type
  May be nested in another defined Type
  May have predefined values (viz. an enumerated type)
  May be annotated In one embodiment, defined types are partitioned into:
  Feature
  Part
  Enumeration
  Container For instance, taking tabular variances of PostGIS, e.g., points, align strings, polygons, and transforming them into corresponding geometry types for serialization. As another instance, special defined types for GeoJSON can include features of a primary geometry that will become the geometry of the GeoJSON elements. In GeoJSON, when there is a routing point to pick one of geometries of a map feature, then a developer does not know that thing called a routing point anymore, since there is a top level geometry type which does not allow a developer to provide a name for that geometry. As the primary geometry and then the routing point is serialized out, the semantic id lost. In the Shift model, a developer can tag the semantic of a routing point to the primary geometry, without losing as simple as the name of a property or the name of a field, e.g., a routing point. As such, the Shift model keeps the semantics for the developer to know that the property is called.

Features and Parts form hierarchical entities, rooted at a Feature. The schematic summary of Feature and Part types is depicted in FIG. 5F. A Feature is the root of a hierarchical ("document") structure comprising the Feature and a tree of Parts. Parts are "owned" by the type instance of which they are property. In one embodiment, valid property types for a Feature or Part include (1) Primitive (e.g., Int, Long, Double, String, Character, Boolean, etc.), (2) Part Type, (3) Feature Pointer (ref): wraps a Feature Type, (4) Collection: List, Set, Optional (Set semantics being order preserving, but not as general as Scala/Java Set, and wraps a Primitive, Feature Pointer, or Part Type, while excluding nested collections such as List(Set(Int)), and Direct feature (as opposed to a Feature Pointer).

An Enumeration is a set of statically defined values. Containers are equivalent to partitioned layers of spatial catalogs or databases. For example, a Container type corresponds to a layer, and a Container instance corresponds to a single partition within a layer.

In one embodiment, Part semantics include: Part instances (values) are "owned" by the type instance of which they are property. For document structured representations such as JSON or protobuf, this means that the part value is enclosed in the representation of the owning instance. For tabular SQL representations this means that the rows representing the part value may be deleted in a cascading fashion when the enclosing instance is deleted. A Part type may have a key, but does not need to. If a Part type has a key, the key is guaranteed unique only in the context of the owning type. The following is an example of a definition of a part (e.g., the example definition includes documentation, inheritance, two constraints, and a property):

```
// A line string, sometimes referred to as a polyline. Consists of two or more
// points where each consecutive pair of points is linked with a straight line. part line-string
extends spatial
    -> ge(size(.point), 2)
    -> distinct internal points | hasDistinctValues(tail(.point))
    // The points that make up the line string.
    point: repeated point
```

In one embodiment, Feature semantics include: Instances represent distinct identifiable entities with globally unique keys. Instances are referenced by "pointer" from other feature and part instances. A Feature is the root of a hierarchical ("document") structure comprising the Feature and a tree of Parts. The following is an example of definition of a feature (e.g., the properties of type node are references to another feature, while line-string is the in-line use of a part):

```
// A topology segment.
feature segment
    // An identifier for the segment.
    identifier: string -- key
    // The start node for the segment.
    start-node: node
    // The end node for the segment.
    end-node: node
    // Line string geometry for the segment, running from start to end node.
    geometry: com/here/schema/geometry/v2/line-string
    // Length of the segment in meters.
    length: double
```

In one embodiment, enumerated types are types with a finite set of predefined values. The values are distinguished by string labels. An enumerated type may also have properties. If so, the property types must be primitive types. The following is an example of an enumeration with properties.

```
enum RgbColor
    red: Int
    green: Int
    blue: Int
    Black(0,0,0)
    White(255,255,255)
enum TransparentColor
    color: RgbColor // not primitive
    transparency: Double
    OpaqueWhite(White, 0.0)
    InvisibleBlack(Black, 100.0)
```

As another example, the properties can be name, isoAlpha2, isoAlpha3, and isoNumeric, and the value labels can be Germany, Finland, Italy, United States as follows.

```
enum Iso166Country
    name: String
    isoAlpha2: String
    isoAlpha3: String
    isoNumeric: Int
```

-continued

```
    Germany("Deutschland", "DE", "DEU", 276)
    Finland("Suomi", "FI", "FIN", 246)
    Italy ("Italia", "IT", "ITA", 380)
    UnitedStates("United States of America", "US", "USA", 840)
```

In one embodiment, Containers have a partition key and a partitioning scheme, i.e., Containers are Partitioned Layers as shown in FIG. 5G. For instance, Container types 541 mathematically partition feature types 543 based on a partition scheme 545 and a key 547, while each container type defines a layer, and each feature type belongs to exactly one container type. The feature's partition key 547 can be computed by an expression, and the feature's partition key 547 determines which container instance it belongs to. An expression 549 associated with a function call 551 can bind to an arbitrary Shift property expression 553 or an external function expression 555 with an external binding 557 (e.g., a Java Library 559a, a Python Library 559b, a JavaScript Library 559c, etc.). In one embodiment, Containers share property semantics with parts and features plus direct feature inclusion. Valid Property types for containers can include (1) any property type valid for a part or feature, and (2) Direct feature: Feature, Set(Feature), List(Feature), Optional(Feature), etc. This reflects the role of Container Types as the mechanism to partition feature types into layers. The following is an example definition of a container with properties:

```
container AdminLayer
    country: ref Country
    admins: repeated AdminPlace
```

In one embodiment, Container Types can provide partitioning and layering semantics. Container Types are optional in a model. For models representing platform catalogs, container types are present and provide the layering and partitioning semantics for the platform catalog. In one embodiment, Container Types: (1) have a unitary key with a string or integer type (which is the partitioning key); (2) have a partitioning scheme (e.g. Heretile or generic); (3) mathematically partition a model's feature types into layers, while every Feature Type being the property type of some Container Type and No Feature Type being the property type of more than one Container Type; and (4) have Annotations providing expressions to compute a Feature instance's partition key, and the expressions optionally involving calling an external function binding.

The following is an example of definition of a container for grouping node and segments features:

```
// The topology/geometry partition contains a connected graph of segments and nodes.
container topology-geometry-partition
    partition-name: string
    node: repeated node -- distinct
    segment: repeated segment -- distinct
```

In one embodiment, inheritance provides a reuse mechanism that maps to Scala inheritance (e.g., the parent type becomes a Scala trait), that maps to a flattened (repeated) structure in protobuf, or that maps to a flattened structure in SQL (including mapping inheritance to alternate SQL and protobuf representations, controlled by Annotations). The following is an inheritance example.

```
part NamedPlace
    names: repeated Names
feature AdminPlace extends NamedPlace
    level: AdminPlace.AdminLevel
```

In one embodiment, nesting is supported primarily for reverse engineering existing models with nested type defi-

```
Path(.parent).isDefined iff Path(.level) =/= Literal(1)
Path(.parent).isDefined implies (Path(.parent.level).get ===
(Path(.level) − Literal(1)))
Path(.names).existsUnique(Path(_.nameType) === NameType(base))
```

The following are examples of generated code based on the above constraints.

```
lazy val subConstraints: ConstraintOutcome = {
    mainBranch.satisfiesConstraints &&
        otherBranches.map(_.satisfiesConstraints).fold(ConstraintOutcome.True)(_&&_)
}
/** (Library.identifier).nonEmpty */
lazy val constraint17: ConstraintOutcome= {
    if ((this.identifier.nonEmpty))
        ConstraintOutcome.True
    else
        ConstraintOutcome("""violated Library: (Library.identifier).nonEmpty""")
}
/** (Library.name).nonEmpty */
lazy val constraint18: ConstraintOutcome = { ... }
/** (TO_SET(Library.catalog) ==
 *                          UNION(TO_SET(Library.mainBranch.books.title),
TO_SET(Library.otherBranches.books.title))) */
lazy val constraint19: ConstraintOutcome= { ... }
/** @inheritDoc */
lazy val satisfiesConstraints: ConstraintOutcome= {
    subConstraints && constraint17 && constraint18 && constraint19
}
``` nitions, such as map content protobuf that maps to Scala nested type defined in a companion object, or maps to protobuf nested message definitions, and appears in the name of generated SQL tables (yet without structural implication). The following is a nesting example.

```
feature AdminPlace
    names: repeated Names
    level: AdminPlace.AdminLevel
    enum AdminPlace.AdminLevel
        Country
        State
        County
        City
```

In one embodiment, the system 100 provides basic structural semantics specifically for collection semantics of List, Set, and Optional. Shift Expression language can extend the semantics with richer property based expressions. The building blocks for constraint expressions can include (1) Literals: 0, 3.14, "Hello, world", true; (2) Path expressions: .parent.level; (3) Primitive Operators such as: ===, <, AND, NOT, +, unary −, match (regex), size, in, head, tail, filter, intersection, etc.; and (4) Composite Operators such as: =/1=, <=, >, >=, OR, IMPLIES, exists, all. The following are example constraints in Scala API pseudo-code.

```
feature AdminPlace
    names: repeated Name
    level: Int
    parent: optional ref AdminPlace
part Name
    nameType: NameType
    name: String
enum NameType
    base
    synonym
// Admin Place contraints (in simplified Scala API form)
Path(.level) >= Literal(1) and Path(.level) <= Literal(5)
```

In one embodiment, Annotations provide target syntax hints, such as (1) Protobuf reference type (e.g., Logical ref maps to a proto specific type, e.g., Reference.), (2) Protobuf reference property rename rule (e.g., Logical parent: ref AdminPlace maps to parent_ref: Reference.), (3) Protobuf pooling (e.g., Flags certain types in a container as pooled, e.g. SegmentAnchor.), (4) Protobuf pool index property rename rule (e.g., Maps logical anchor: SegmentAnchor to anchor_index: Int32.), (5) Protobuf field numbering override, (6) Scala partition function binding (e.g., Maps a feature type, such as Segment, to a function call expression, such as "heretile(.geometry.firstPoint.lat, .geometry.firstPoint.lon)", which in turn is bound to an external Scala function (WIP). The following is an Annotations example that decouples storage optimization from a logical model.

```
@ProtobufPoolType(SegmentAnchor,
    Hint(protobuf,
        NativeType(uint32),
        PropertyNameSuffix(Index))
container RoadAttributesPartition
    partitionName: String
    segmentAnchor: repeated SegmentAnchor
    functionalClass:
        repeated FunctionalClassAttribute
@Hint(protobuf,Aggregate(functioncalClass))
feature FunctionalClassAttribute
    functionalClass: FunctionalClass
    anchor: SegmentAnchor
// generated protobuf
message FunctionalClassAttribute {
    functionalClass: FunctionalClass
    anchor_index: repeated uint32
}
```

The system 100 improves over protobuf with (1) logical abstraction: clear separation of essential logical model from representation-specific optimizations; (2) rich semantics: constraint language enriching basic structural semantics; (3) support for multiple representation formats leveraging standard tools; and (4) better code generation: (a) replacing hand written boilerplates; reducing errors; encouraging reuse; lowering cost; (b) ergonomic in-memory representation, augmentable with support libraries; (c) supporting generic tools against common interfaces; and (d) Generated code better than hand written: architecturally consistent; full featured; extensible; and (5) transparent model extensibility: backward compatibility across all targets, and forward migration eased by the generated code.

FIG. 5H depicts a Shift semantic type architecture with traitor abstract classes in broken line boxes and concrete classes in solid line boxes. For instance, the semantic type 561 includes a DefinedType 563a, a Primitive 563b, and a WrapperType 563c. The DefinedType 563a includes a Defined Enum Type 565a, a General Type 565b, and a Structural Type 565c. An Enumeration type 567a references to the Defined Enum Type 565a and the General Type 565b. A Container type 567b references to the General Type 565b and the Structural Type 565c. A Feature type 567c also references to the General Type 565b and the Structural Type 565c. A Part type 567d references to the General Type 565b and the Structural Type 565c as well.

The Primitive 563b includes numeric 565d, Text 565e, and Boolean 565f. The numeric 565d includes Double 567e, Long 567f, and Int 567g. The Text 565e includes String 567i, and Character 567h. The WrapperType 563c includes Collection Type 565g and Feature Pointer 565h. The Collection Type 565g includes ListOf 567j, SetOf 567k, and Optional 567l.

Figure 5I:
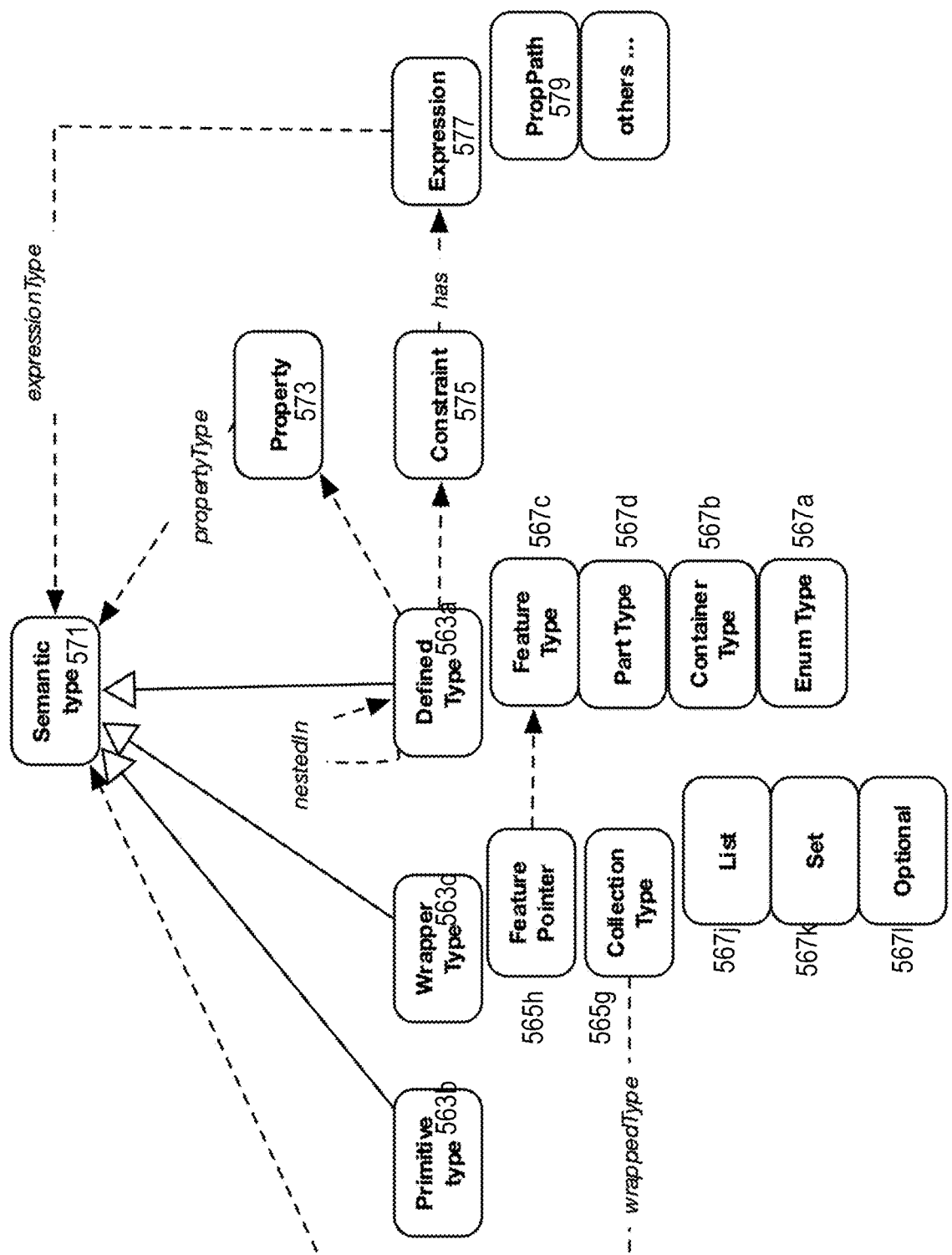
Figure 5J:
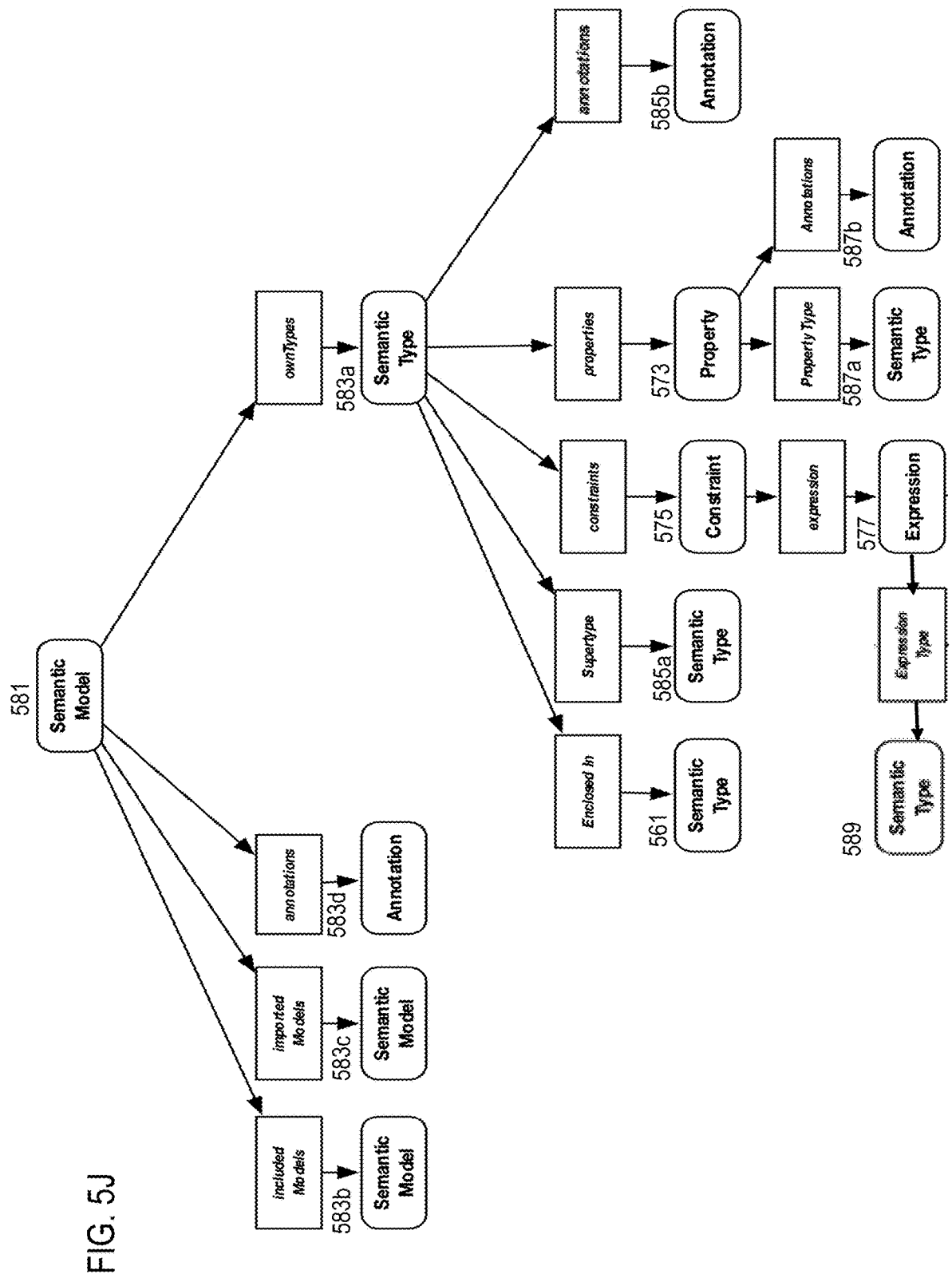

In FIG. 5I, the Collection Type 565g can reference via the WrapperType 563c to a semantic type 571. The Feature Pointer 565h can reference to the Feature type 567c. The DefinedType 563a can nest itself. In addition, the DefinedType 563a can reference to a Property 573, and then reference via a property type to the semantic type 571. Moreover, the DefinedType 563a can reference a Constraint 575 that has an Expression 577 (including PropPath 579, etc.), and then reference via an expression type to the semantic type 571. FIG. 5J depicts another Shift semantic types architecture including additional semantic type architectures than those on FIG. 5I to support reverse engineering, etc. In one embodiment, nesting is supported primarily for reverse engineering existing models with nested type definitions, such as map content protobuf that maps to Scala nested type defined in a companion object.

In particular, FIG. 5J depicts a Shift model architecture including the semantic type architecture of FIG. 5I and additional semantic types (e.g., Property, Constraint, etc.). For instance, the semantic model 581 includes its own semantic type architecture 583a ("ownTypes"), included semantic model 583b ("includedModels"), imported semantic model 583c ("importedModels"), and Annotation 583d ("annotations") at a first level. The semantic type architecture 583a includes the semantic type 561 ("Enclosed In") of FIG. 5H, a semantic type 585a ("Supertype"), the Constraint 575 ("constraints"), the Property 573 ("properties"), and Annotation 585b ("annotations") at a second level. The Constraint 575 can reference the Expression 577 then to another semantic type 589 ("Expression Type"). The Property 573 can reference another semantic type 587a ("Property Type") and to Annotation 587b ("annotations") at a third level.

In one embodiment, map data is represented in Shift in memory format, rather Proto binding. In another embodiment, an application or a tool is provide on top of the Shift model using a complier based on Apache Spark that can read the map data then write back in, e.g., extract, transform, load (ETL). The application/tool can leverage the knowledge of the Shift model to know the relationships between the data and maps as an interconnected web, and convert different portions of a map in parallel in the background in repose to queries, such as roads connecting a restaurant, a polygon of a park, etc., without requiring a developer of the application/tool to manually add semantic notes (e.g., routing graphs). The Shift model can be used for analytics, such as running statistics on data itself, such as tabular representations (e.g., Parquet), for example, to automatically create an optimized map for analytics effectively. In yet another embodiment, data of different formats are automatically transformed using the Shift model then ingested into the navigation platform. In yet another embodiment, the Shift model supports easy data inspect and manipulation of data model abstract, spark complier, APIs with common elements, e.g., deleting all points referencing a piece of data without knowing the data models. For instance, by cascading the delete right, a developer does not have to know what the feature is, to delete it and then get anything that references it. This is useful in the case of alignment rule or the like. So if there are different layers of a map, when one layer changes, the developer can change the other layer(s) to automatically.

The above-discussed embodiments can make the model for mapping data easier to understand and easier to work with, expose the core logical model, and hide storage specific optimizations. The above-discussed embodiments keep semantics untouched between the different representations, and get the semantic back at run-time for a representation of interest, thereby saving developer time resources by automate optimal serialization and providing high-level views of abstract objects code.

The above-discussed embodiments can be more general than mapping data by supporting any protobuf model, any XYZ's Map Object model (e.g., JSON), Core Map's RMOB model (e.g., Java, SQL, etc.). The above-discussed embodiments can support richer semantics than protobuf using references, optionality, richer collection semantics, multi-property semantics, inheritance, executable documentation, etc. The above-discussed embodiments can include SQL, Scala, protobuf, etc. as target syntaxes. The above-discussed embodiments can focus on structural semantics (rather than behavioral semantics) by capturing valid state semantics, but not necessarily state transitions.

Returning to FIG. 1A, as shown, the system 100 includes the data platform 111 capable of providing a broker for data modeling and code generation according to the embodiments described herein. In one embodiment, the data platform 115, user device 119, and/or other client devices have connectivity or access to the geographic database 101 which stores representations of mapped geographic features to facilitate mapping/navigation-related applications or services.

In one embodiment, the data platform 115, user device 119, etc. have connectivity over the communication network 123 to the services platform 103 that provides one or more services 105 related to map data and/or other data services. By way of example, the services 105 may be third party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc. that provides or ingests data according to different data representation formats.

In one embodiment, the data platform 115, services platform 103, and/or other components of the system 100 may be platforms with multiple interconnected components. The data platform 115, services platform 103, etc. may include multiple servers, intelligent networking devices, computing devices, components, and corresponding software for providing a broker for data modeling and code generation. In addition, it is noted that the data platform 115 may be a separate entity of the system 100, a part of the one or more services 105, a part of the services platform 103, or other component of the system 100.

In one embodiment, content providers may also provide content or data using the embodiments described herein. The content provided may be any type of content, such as map content, textual content, audio content, video content, image content, other data, etc. using the embodiments of the shift data platform 115 described herein. In one embodiment, the content providers 119 may also store content associated with the geographic database 101, data platform 115, user device 119, and/or other components of the system 100. In another embodiment, the content providers may manage access to a central repository of data, and offer a consistent, standard interface to data, such as a repository of the geographic database 101.

In one embodiment, the user device 119 or other client devices may execute a software application 117 to that uses data according the embodiments described herein. By way of example, the application 117 may also be any type of application that is executable on the user device 119 such as but not limited to autonomous driving applications, mapping applications, location-based service applications, navigation applications, content provisioning services, camera/imaging application, media player applications, social networking applications, calendar applications, and the like. In one embodiment, the application 117 may act as a client for the data platform 115, services platform 103, and/or services 105 and perform one or more functions associated with providing a broker for data modeling and/or code generation.

By way of example, the user device 119, and/or other client device is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the client devices can support any type of interface to the user (such as "wearable" circuitry, etc.). In one embodiment, the user device 119 and/or other client devices may be associated with a vehicle or be a component part of the vehicle.

In one embodiment, the user device 119 and/or other client devices are configured with various sensors for generating or collecting environmental sensor data, related geographic data, etc. including but not limited to, optical, radar, ultrasonic, LiDAR, etc. sensors. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the client devices may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the user device 119 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the user device 119 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 123 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the data platform 115, services platform 103, services 105, user and/or device 119 communicate with each other and other components of the system 100 using well known, new or still developing protocols. In this context, a protocol includes a set of rules defining how the network nodes within the communication network 123 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
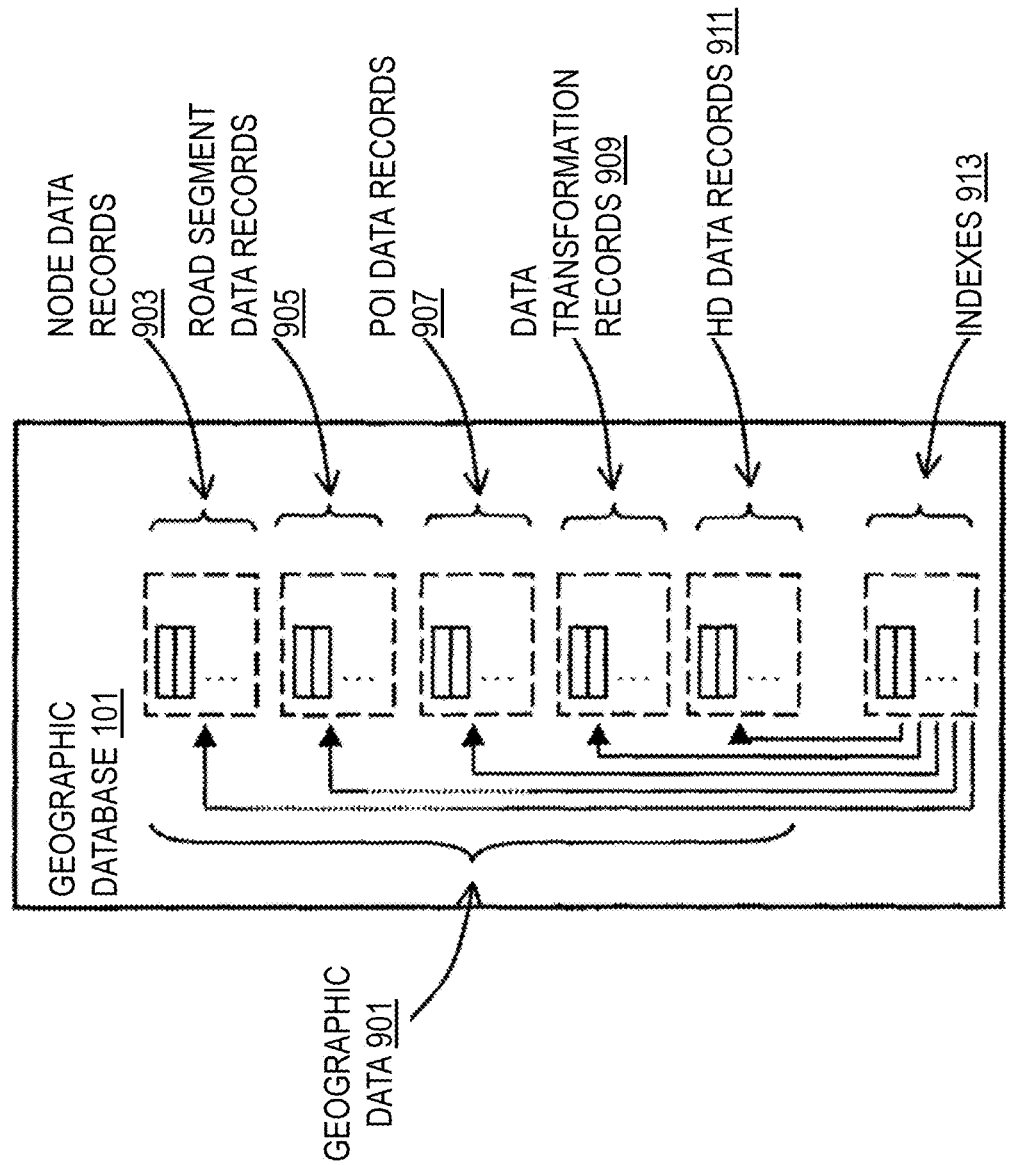
FIG. 9 is a diagram of a geographic database, according to one embodiment.

FIG. 9 is a diagram of a geographic database 101, according to one embodiment. In one embodiment, the geographic database 101 includes geographic data 901 used for (or configured to be compiled to be used for) mapping and/or navigation-related services. In one embodiment, the geographic database 101 include high resolution or high definition (HD) mapping data that provide centimeter-level or better accuracy of map features. For example, the geographic database 101 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as sign posts, including what the signage denotes. By way of example, the HD mapping data enable highly automated vehicles to precisely localize themselves on the road, and to determine map data updates (e.g., learned speed limit values) to at high accuracy levels.

In one embodiment, geographic features (e.g., two-dimensional, or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 101.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 101 follows certain conventions. For example, links do not cross themselves and do not cross each other except at a node. Also, there are no duplicated shape points, nodes, or links. Two links that connect each other have a common node. In the geographic database 101, overlapping geographic features are represented by overlapping polygons. When polygons overlap, the boundary of one polygon crosses the boundary of the other polygon. In the geographic database 101, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the geographic database 101 is stored as a hierarchical or multi-level tile-based projection or structure. More specifically, in one embodiment, the geographic database 101 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

As shown, the geographic database 101 includes node data records 903, road segment or link data records 905, POI data records 907, data transformation records 909, HD mapping data records 911, and indexes 913, for example. More, fewer, or different data records can be provided. In one embodiment, additional data records (not shown) can include cartographic ("carto") data records, routing data, and maneuver data. In one embodiment, the indexes 913 may improve the speed of data retrieval operations in the geographic database 101. In one embodiment, the indexes 913 may be used to quickly locate data without having to search every row in the geographic database 101 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 101 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 101 can include data about the POIs and their respective locations in the POI data records 907. The geographic database 101 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 101 can also include data transformation records 909 for storing data related to data modeling and/or code generation according to the embodiments described herein. In one embodiment, the data transformation records 909 can be associated with one or more of the node records 903, road segment records 905, and/or POI data records 907 to so that the data transformation records 909 can be spatially partitioned. In one embodiment, the data transformation records 909 are stored as a data layer of the hierarchical tile-based structure of the geographic database 101.

In one embodiment, as discussed above, the HD mapping data records 911 model road surfaces and other map features to centimeter-level or better accuracy. The HD mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 911 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 101 can be maintained by the content provider 119 in association with the services platform 103 (e.g., a map developer). The map developer can collect geographic data to generate and enhance the geographic database 101. There can be different ways used by the map developer to collect data. These ways can include obtaining data from other sources, such as municipalities or respective geographic authorities. In addition, the map developer can employ field personnel to travel by vehicle (e.g., vehicle 101 and/or user device 119) along roads throughout the geographic region to observe features and/or record information about them, for example. Also, remote sensing, such as aerial or satellite photography, can be used.

The geographic database 101 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle 101 or user device 119. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a broker for data modeling and code generation may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
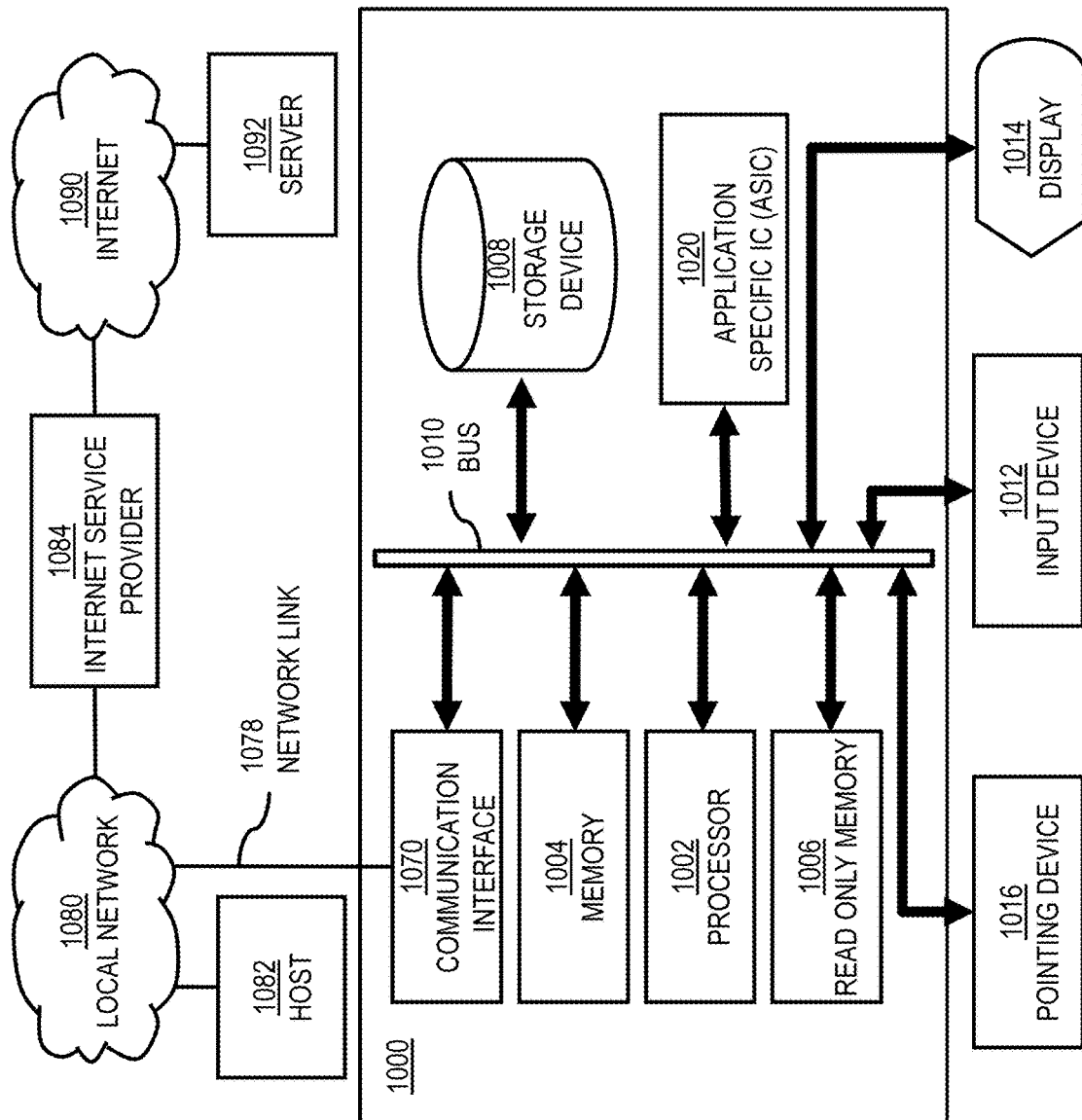
FIG. 10 is a diagram of hardware that can be used to implement an embodiment.

FIG. 10 illustrates a computer system 1000 upon which an embodiment of the invention may be implemented. Computer system 1000 is programmed (e.g., via computer program code or instructions) to provide a broker for data modeling and code generation as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to providing a broker for data modeling and code generation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for providing a broker for data modeling and code generation. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk, or flash card, for storing information, including instructions, that persists even when the computer system 1000 is turned off or otherwise loses power.

Information, including instructions for providing a broker for data modeling and code generation, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners, and external disks. In general, the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic, or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 123 for providing a broker for data modeling and code generation.

The term computer-readable medium is used herein to refer to any medium that participates in providing information to processor 1002, including instructions for execution. Such a medium may take many forms, including, but not limited to, non-volatile media, volatile media, and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system can be deployed in various configurations within other computer systems, e.g., host 1082 and server 1092.

FIG. 11 illustrates a chip set 1100 upon which an embodiment of the invention may be implemented. Chip set 1100 is programmed to provide a broker for data modeling and code generation as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide a broker for data modeling and code generation. The memory 1105 also stores the data associated with or generated by the execution of the inventive steps.

Figure 12:
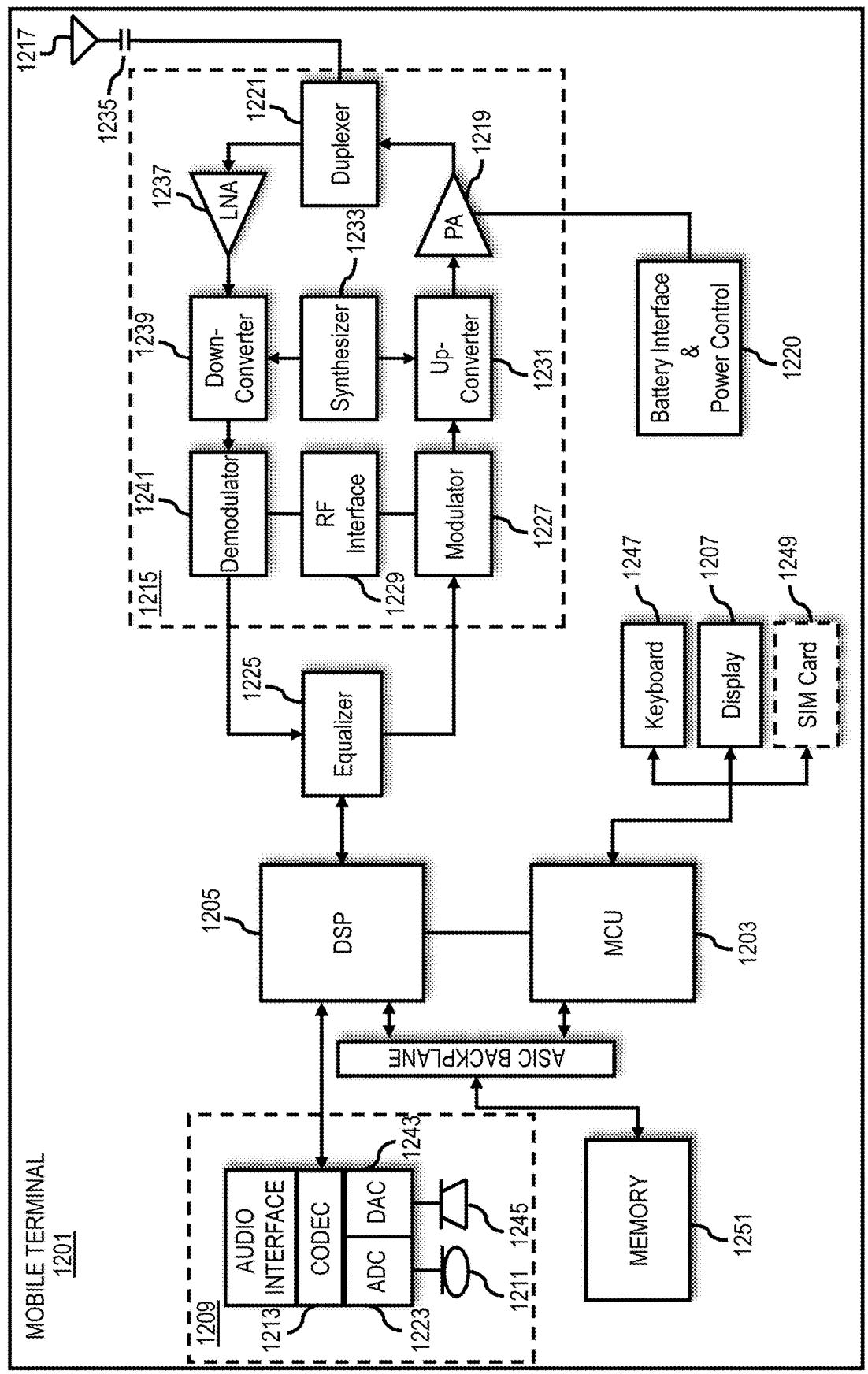
FIG. 12 is a diagram of a mobile terminal (e.g., handset or other mobile device, like a vehicle or part thereof) that can be used to implement an embodiment.

FIG. 12 is a diagram of exemplary components of a mobile terminal 1201 (e.g., e.g., a user device 119 or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to provide a broker for data modeling and code generation. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A system comprising:
   a syntax for generating a model representing data and semantics of the data;
   an architecture configured to accept the data according to any of a plurality of data representations; and
   a code generator configured to generate computer code to transform the data between the plurality of data representations by using the model as a broker between the plurality of data representations,
   wherein the code generator preserves the semantics of the data during the transforming of the data and as a function of two or more selected from: foreign key modeling and resolution, feature type inheritance, and constraint language, and
   wherein the constraint language defines a constraint representing path-based semantics on the model, the constraint being included in an executable target code for enforcement at run-time.

2. The system of claim 1, wherein the plurality of data representations includes a serialization format, and an in-memory application model.

3. The system of claim 1, wherein the foreign key modeling and resolution comprise providing an application programming interface to define a relationship between a feature in the data and a referenced feature that is not in the data.

4. The system of claim 3, wherein the application programming provides a function to retrieve the referenced feature directly based on the feature.

5. The system of claim 1, wherein the system is further configured to:
   designate a name of the constraint; and
   provide the name as documentation of the constraint in the executable target code.

6. The system of claim 1, wherein the system further comprises an annotation to the model, and wherein the annotation provides one or more parameters for the transforming of the data between the plurality of data representations.

7. The system of claim 6, wherein the annotation is specific to a target data representation of the plurality of data representations.

8. The system of claim 1, wherein the data is existing data that is formatted according to one data representation of the plurality of data representation, the system further comprising:
   a reverse engineering component configured to populate the model by transforming the existing data from the one data representation based on the syntax.

9. The system of claim 8, wherein the reverse engineering module is further configured to parse the existing data to identify one or more data elements corresponding to the model based on the syntax.

10. The system of claim 9, wherein the reverse engineering module is further configured to specify a configuration rule for parsing the existing data according to the syntax.

11. The system of claim 1, wherein the syntax includes a container type, and wherein the containing type is used to automatically partition the data.

12. The system of claim 1, wherein the code generator preserves the semantics of the data during the transforming of the data in terms of serialized and in-memory representations of the data.

13. A method comprising:
    generating a model representing data and semantics of the data based on a syntax; and
    generating computer code to transform the data between a plurality of data representations by using the model as a broker in an architecture configured to accept the data according to any of a plurality of data representations,
    wherein the generating of the computer code preserves the semantics of the data during the transforming of the data and as a function of two or more selected from: foreign key modeling and resolution, feature type inheritance, and constraint language, and
    wherein the constraint language defines a constraint representing path-based semantics on the model, the constraint being included in an executable target code for enforcement at run-time.

14. The method of claim 13, wherein the plurality of data representations includes a serialization format, and an in-memory application model.

15. The method of claim 13, wherein the foreign key modeling and resolution comprise providing an application programming interface to define a relationship between a feature in the data and a referenced feature that is not in the data.

16. The method of claim 13, further comprising:
    creating an annotation to the model,
    wherein the annotation provides one or more parameters for the transforming of the data between the plurality of data representations.

17. The method of claim 13, wherein the code generator preserves the semantics of the data during the transforming of the data in terms of serialized and in-memory representations of the data.

18. An apparatus comprising:
    at least one processor; and
    at least one memory including computer program code for one or more programs,
    the at least one memory and the computer program code configured to, with the at least one processor, cause the apparatus to perform at least the following,
    parse data to populate a data model based on a syntax associated with the data model;
    process the data model to generate computer code to transform the data between a plurality of data representations by using the data model as a broker between the plurality of data representations; and
    provide the computer code as an output,
    wherein the generating of the computer code preserves the semantics of the data during the transforming of the data and as a function of two or more selected from: foreign key modeling and resolution, feature type inheritance, and constraint language, and
    wherein the constraint language defines a constraint representing path-based semantics on the model, the constraint being included in an executable target code for enforcement at run-time.

19. The apparatus of claim 18, wherein the plurality of data representations includes a serialization format, and an in-memory application model.

20. The apparatus of claim 18, wherein the apparatus is further caused to:
    specify a configuration rule for parsing the existing data according to the syntax.

* * * * *